(12) United States Patent
Parviainen et al.

(10) Patent No.: US 9,544,740 B2
(45) Date of Patent: Jan. 10, 2017

(54) METHOD, APPARATUS AND COMPUTER PROGRAM PRODUCT FOR ORIENTING A SMARTPHONE DISPLAY AND ESTIMATING DIRECTION OF TRAVEL OF A PEDESTRIAN

(71) Applicant: Nokia Technologies Oy, Espoo (FI)

(72) Inventors: Jussi Tapani Parviainen, Pirkkala (FI); Jussi Taneli Collin, Viiala (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/760,624

(22) PCT Filed: Jan. 18, 2013

(86) PCT No.: PCT/US2013/022075
§ 371 (c)(1),
(2) Date: Jul. 13, 2015

(87) PCT Pub. No.: WO2014/113014
PCT Pub. Date: Jul. 24, 2014

(65) Prior Publication Data
US 2015/0365806 A1 Dec. 17, 2015

(51) Int. Cl.
*H04W 4/04* (2009.01)
*G06F 3/0346* (2013.01)
(Continued)

(52) U.S. Cl.
CPC .............. *H04W 4/043* (2013.01); *G01C 21/20* (2013.01); *G01C 21/206* (2013.01);
(Continued)

(58) Field of Classification Search
CPC ........ H04W 4/043; H04W 4/027; H04W 4/02; H04W 4/028; H04W 64/00; H04W 4/00; H04W 4/046; H04W 4/026; H04W 4/12; H04W 4/206; G06T 3/606; G09G 5/38; G09G 2340/0464; G09G 2340/0492; G09G 2354/00
See application file for complete search history.

(56) References Cited

U.S. PATENT DOCUMENTS 6,132,391 A   10/2000  Onari et al.
8,452,273 B1 *  5/2013  Khomenko ............ G01C 21/16
                                                 455/418
(Continued)

OTHER PUBLICATIONS

International Search Report and Written Opinion received for corresponding Patent Cooperation Treaty Application No. PCT/US2013/022075, dated Oct. 17, 2013, 14 pages.
(Continued)

*Primary Examiner* — Hirdepal Singh
(74) *Attorney, Agent, or Firm* — Locke Lord LLP

(57) ABSTRACT

Method, apparatus, and computer program product embodiments provide position determination. An example method embodiment comprises measuring in a mobile device, acceleration in mutually orthogonal x and y directions in a horizontal plane and in a vertical direction, due to walking motion of a user holding the device; computing a Fourier transform of the measured acceleration in the vertical direction and determining a frequency of acceleration in the vertical direction having a maximum amplitude; computing a Fourier transform of the measured acceleration in the x direction and in the y direction and determining a frequency of acceleration in the x and y directions corresponding to the maximum amplitude frequency of acceleration in the vertical direction; and computing a direction of walking motion of the user, based on the determined frequency of acceleration in the x and y directions corresponding to the maximum amplitude frequency of acceleration in the vertical direction.

14 Claims, 10 Drawing Sheets

(51) Int. Cl.
*G01C 21/20* (2006.01)
*G06T 3/60* (2006.01)
*G09G 5/38* (2006.01)
*H04W 4/02* (2009.01)

(52) U.S. Cl.
CPC ............ *G06F 3/0346* (2013.01); *G06T 3/606* (2013.01); *G09G 5/38* (2013.01); *H04W 4/027* (2013.01); *G06F 2200/1614* (2013.01); *G09G 2340/0464* (2013.01); *G09G 2340/0492* (2013.01); *G09G 2354/00* (2013.01)

(56) References Cited

U.S. PATENT DOCUMENTS

| | | | | |
|---|---|---|---|---|
| 8,683,707 | B1* | 4/2014 | Horton, Jr. | G01C 21/165 33/355 R |
| 9,086,281 | B1* | 7/2015 | Thiagarajan | G01C 21/10 |
| 9,121,714 | B2* | 9/2015 | Janardhanan | G01C 21/165 |
| 2004/0203904 | A1 | 10/2004 | Gwon et al. | |
| 2005/0107110 | A1 | 5/2005 | Vasudevan et al. | |
| 2007/0121560 | A1 | 5/2007 | Edge | |
| 2009/0043504 | A1 | 2/2009 | Bandyopadhyay et al. | |
| 2009/0054076 | A1 | 2/2009 | Evennou et al. | |
| 2010/0106745 | A1 | 4/2010 | Cho et al. | |
| 2010/0167731 | A1 | 7/2010 | Horodezky et al. | |
| 2012/0007779 | A1 | 1/2012 | Klepal et al. | |
| 2012/0044265 | A1 | 2/2012 | Khorashadi et al. | |
| 2012/0086606 | A1* | 4/2012 | Mathews | G01C 21/165 342/461 |
| 2012/0136573 | A1 | 5/2012 | Janardhanan et al. | |
| 2012/0149415 | A1 | 6/2012 | Valaee et al. | |
| 2012/0245839 | A1 | 9/2012 | Syed et al. | |
| 2013/0162481 | A1 | 6/2013 | Parvizi et al. | |
| 2013/0195314 | A1 | 8/2013 | Wirola et al. | |
| 2013/0231889 | A1* | 9/2013 | Hrybyk | G01C 21/20 702/141 |
| 2014/0073345 | A1* | 3/2014 | Chintalapudi | G01C 21/165 455/456.1 |
| 2014/0108544 | A1* | 4/2014 | Lewis | H04W 4/02 709/204 |
| 2014/0302852 | A1* | 10/2014 | Ostergaard | H04W 36/32 455/436 |
| 2014/0347985 | A1 | 11/2014 | Yi et al. | |
| 2015/0004998 | A1* | 1/2015 | Pennanen | H04W 4/02 455/456.1 |
| 2015/0092584 | A1 | 4/2015 | Jung et al. | |
| 2015/0211863 | A1* | 7/2015 | Kourogi | G01P 13/02 702/141 |

OTHER PUBLICATIONS

Melaniz Susi, "Gait Analysis for Pedestrian Navigation using MEMS Handheld Devices", UCGE Reports No. 20359, Sep. 30, 2012. URL: http://plan.geomatics.ucalgary.ca/papers/engo20359_msusi_msc%20thesis_september2012.pdf.

Mariana Natalia Ibarra Bonilla et al. "Pedestrian dead reckoning towards indoor location based applications". Electrical Engineering Computing Science and Automatic Control (CCE), 2011 8th International Conference on, IEEE, Oct. 20, 2011, pp. 1-6.

Stirling R. et al. "Evaluation of a new method of heading estimation for pedestrian dead reckoning using shoe mounted sensors", Jornal of Navigation, Royal Institute of Navigation, London, GB, vol. 58, No. 1, Jan. 1, 2005.

Stephane Beauregard Ed—Anonymous-: "Omnidirectional Pedestrian Navigation for First Responders", Positioning Navigation and Communication, 2007. WPNC'07. 4th Wo Rkshop on, IEEE, PI, Mar. 1, 2007, pp. 33-36.

S. Ayub, et al; Pedestrian Direction of Movement Determination using Smartphone; 2012 Sixth International Conference on Next Generation Mobile Applications, Services and Technologies; 978-0-7695-4803-6112; 2012 IEEE; pp. 64-69.

S. Hoseinitabatabaei, et al; uDirect: A Novel Approach for Pervasive Observation of User Direction with Mobile Phones; 2011 IEEE International Conference on Pervasive Computing and Communications (PerCom), Seattle (Mar. 21-25, 2011; pp. 74-83.

D. Kamisaka, et al; Design and Implementation of Pedestrian Dead Reckoning System on a Mobile Phone; IEICE Trans. Inf. & Syst., vol. E94-D, No. 6, Jun. 2011, pp. 1137-1146.

M. Kourogi, et al; Personal Positioning based on Walking Locomotion Analysis with Self-Contained Sensors and a Wearable Camera; National Institute of Advanced Industrial Science and Technology; University of Washington; ISMAR03 in Tokyo, Japan, pp. 103-112 (2003).

K. Kunze, et al; Which way am I facing: Inferring horizontal device orientation from and accelerometer signal; 2009 International Symposium on Wearable Computers; 1550-4816/09; 2009 IEEE; IEEE computer society; pp. 149-150.

\* cited by examiner

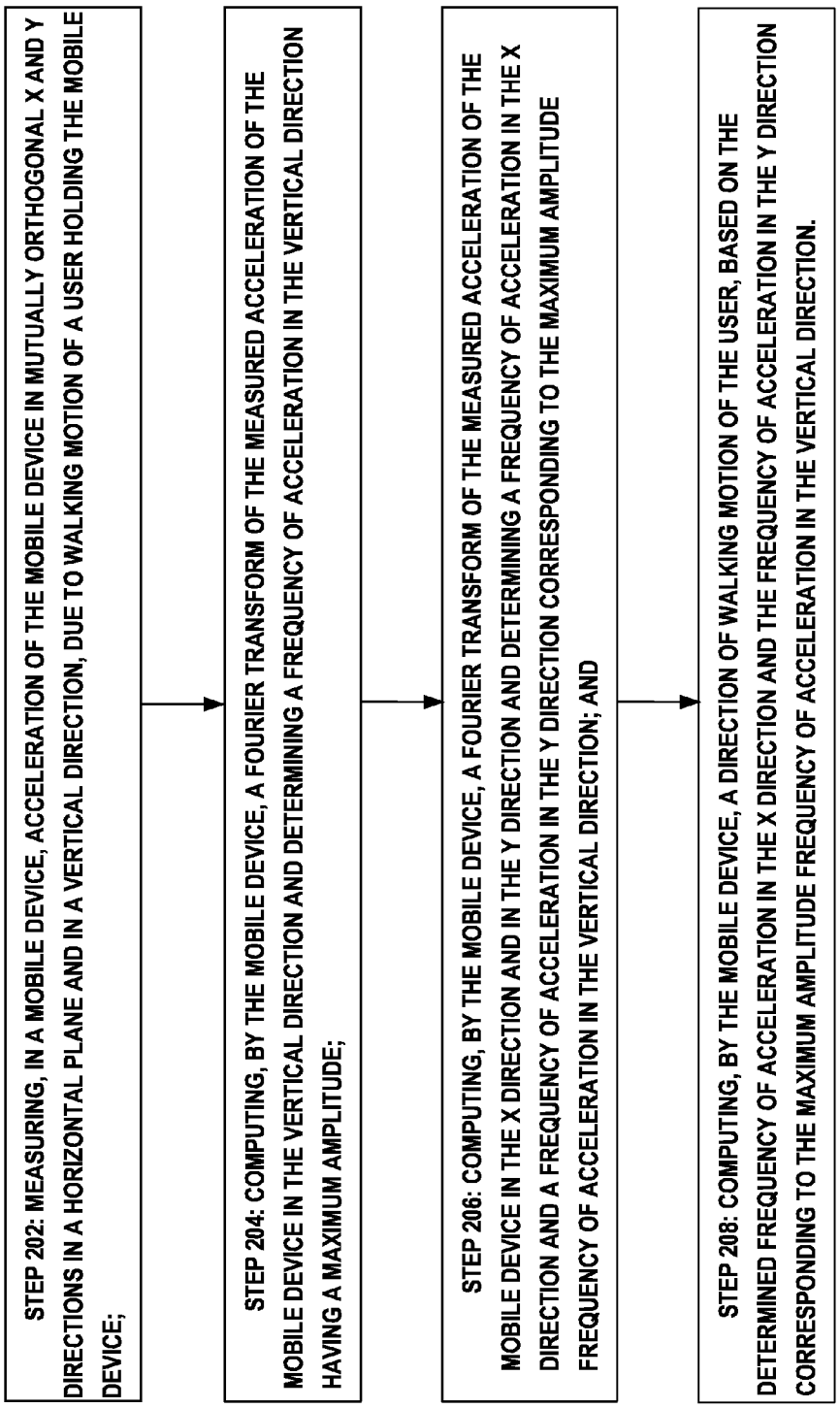

FIG. 4
PROCESS IN MOBILE DEVICE 100

STEP 202: MEASURING, IN A MOBILE DEVICE, ACCELERATION OF THE MOBILE DEVICE IN MUTUALLY ORTHOGONAL X AND Y DIRECTIONS IN A HORIZONTAL PLANE AND IN A VERTICAL DIRECTION, DUE TO WALKING MOTION OF A USER HOLDING THE MOBILE DEVICE;

STEP 204: COMPUTING, BY THE MOBILE DEVICE, A FOURIER TRANSFORM OF THE MEASURED ACCELERATION OF THE MOBILE DEVICE IN THE VERTICAL DIRECTION AND DETERMINING A FREQUENCY OF ACCELERATION IN THE VERTICAL DIRECTION HAVING A MAXIMUM AMPLITUDE;

STEP 206: COMPUTING, BY THE MOBILE DEVICE, A FOURIER TRANSFORM OF THE MEASURED ACCELERATION OF THE MOBILE DEVICE IN THE X DIRECTION AND IN THE Y DIRECTION AND DETERMINING A FREQUENCY OF ACCELERATION IN THE X DIRECTION AND A FREQUENCY OF ACCELERATION IN THE Y DIRECTION CORRESPONDING TO THE MAXIMUM AMPLITUDE FREQUENCY OF ACCELERATION IN THE VERTICAL DIRECTION; AND

STEP 208: COMPUTING, BY THE MOBILE DEVICE, A DIRECTION OF WALKING MOTION OF THE USER, BASED ON THE DETERMINED FREQUENCY OF ACCELERATION IN THE X DIRECTION AND THE FREQUENCY OF ACCELERATION IN THE Y DIRECTION CORRESPONDING TO THE MAXIMUM AMPLITUDE FREQUENCY OF ACCELERATION IN THE VERTICAL DIRECTION.

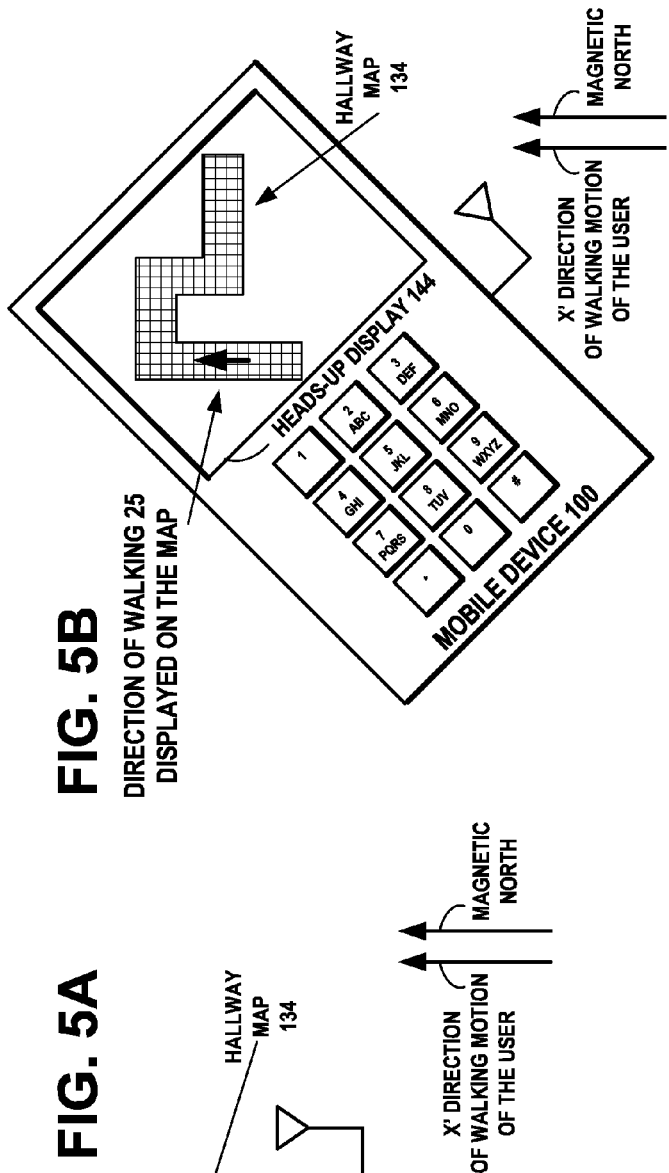
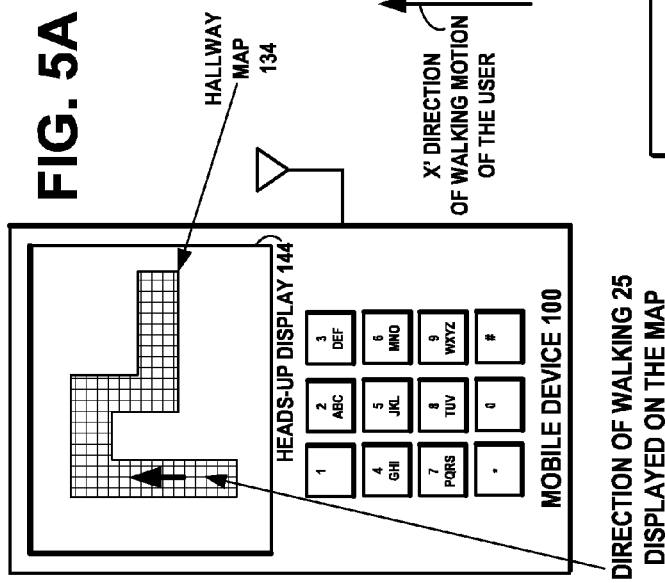
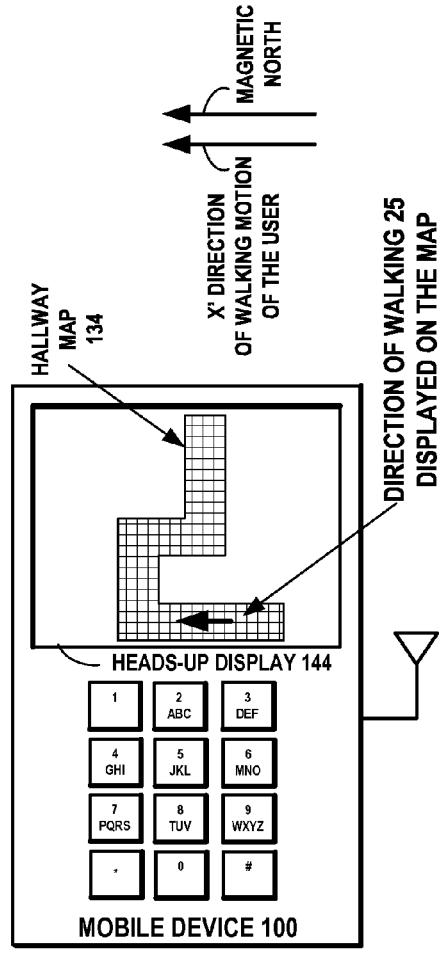

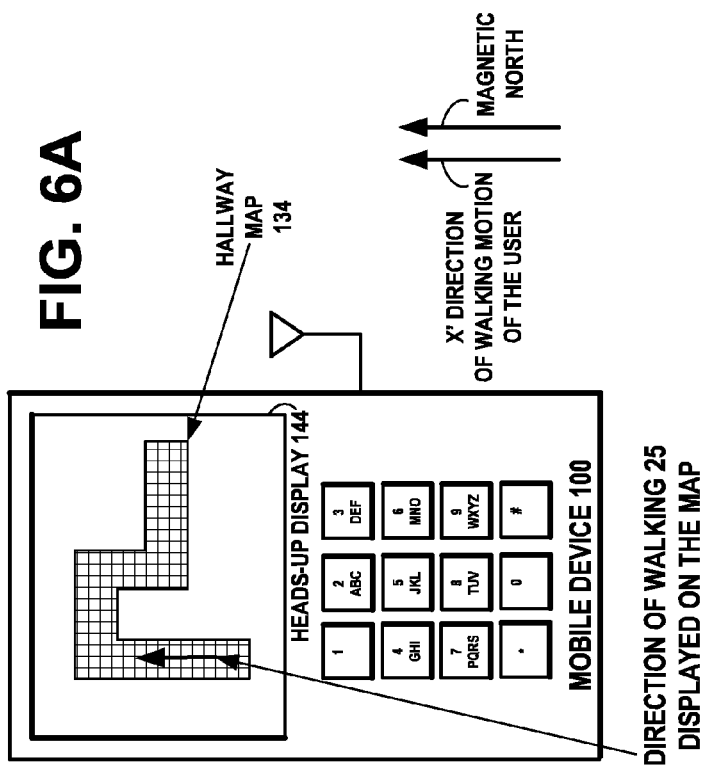
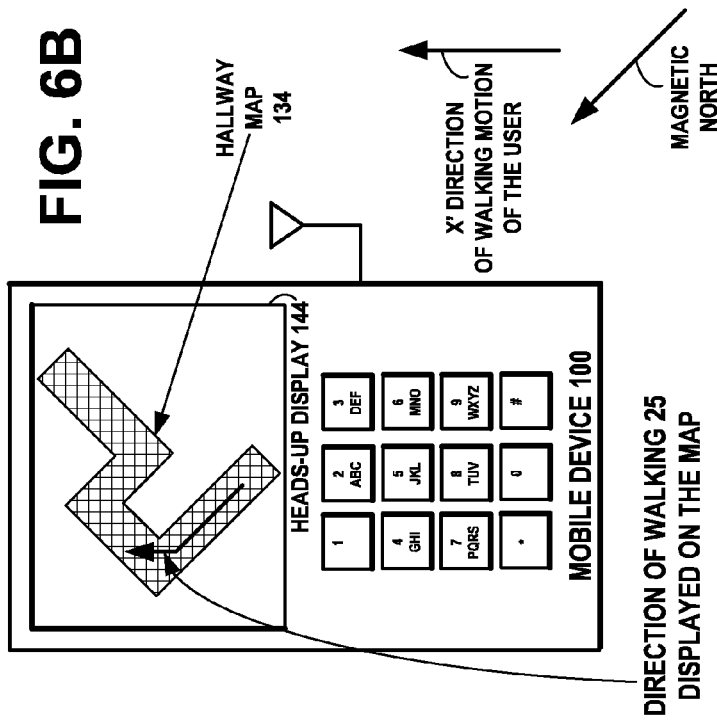

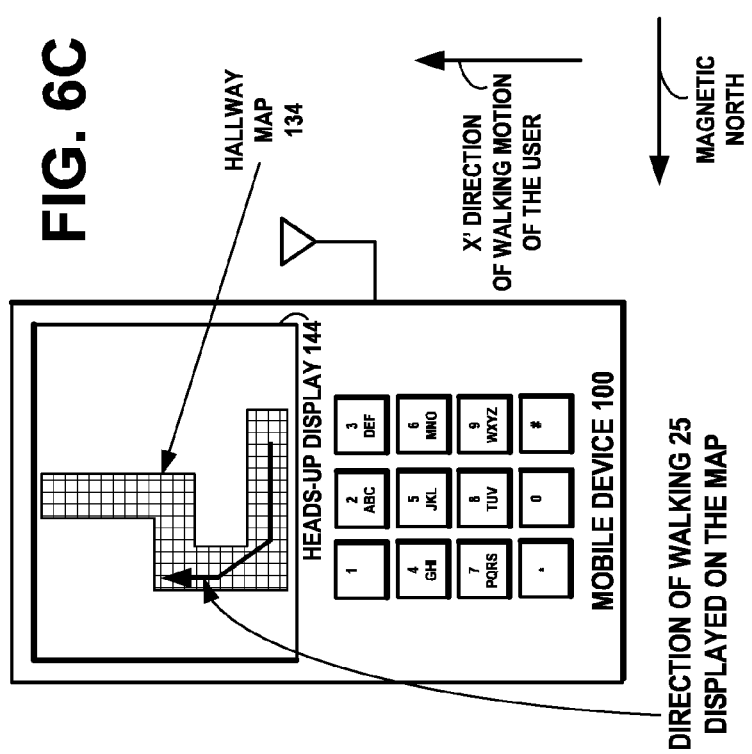

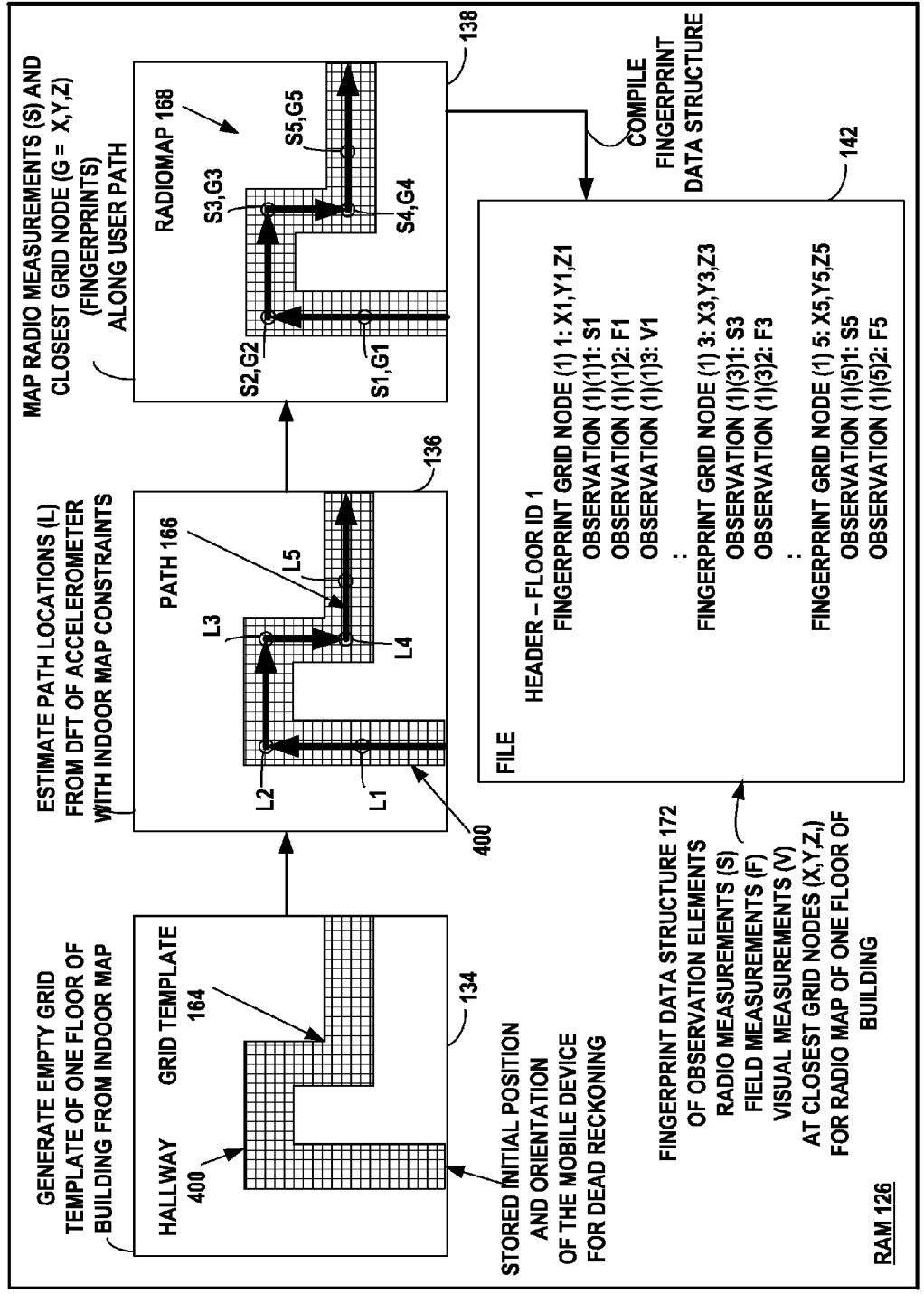

US 9,544,740 B2

METHOD, APPARATUS AND COMPUTER PROGRAM PRODUCT FOR ORIENTING A SMARTPHONE DISPLAY AND ESTIMATING DIRECTION OF TRAVEL OF A PEDESTRIAN

RELATED APPLICATION

This application was originally filed as PCT Application No. PCT/US2013/022075 filed Jan. 18, 2013

FIELD

The field of the invention relates to electronic positioning, and more particularly to wireless position determination.

BACKGROUND

Modern society has adopted, and is becoming reliant upon, wireless communication devices for various purposes, such as connecting users of the wireless communication devices with other users. Wireless communication devices can vary from battery powered handheld devices to stationary household and/or commercial devices utilizing an electrical network as a power source. Due to rapid development of the wireless communication devices, a number of areas capable of enabling entirely new types of communication applications have emerged.

Cellular networks facilitate communication over large geographic areas. These network technologies have commonly been divided by generations, starting in the late 1970s to early 1980s with first generation (1G) analog cellular telephones that provided baseline voice communications, to modern digital cellular telephones. GSM is an example of a widely employed 2G digital cellular network communicating in the 900 MHZ/1.8 GHZ bands in Europe and at 850 MHz and 1.9 GHZ in the United States. While long-range communication networks, like GSM, are a well-accepted means for transmitting and receiving data, due to cost, traffic and legislative concerns, these networks may not be appropriate for all data applications.

Short-range communication technologies provide communication solutions that avoid some of the problems seen in large cellular networks. Bluetooth™ is an example of a short-range wireless technology quickly gaining acceptance in the marketplace. In addition to Bluetooth™ other popular short-range communication technologies include Bluetooth™ Low Energy, IEEE 802.11 wireless local area network (WLAN), Wireless USB (WUSB), Ultra Wideband (UWB), ZigBee (IEEE 802.15.4, IEEE 802.15.4a), and ultra-high frequency radio frequency identification (UHF RFID) technologies. All of these wireless communication technologies have features and advantages that make them appropriate for various applications.

At least one communication-related application currently being offered in various forms is electronic positioning. Basic electronic positioning may provide the current location of a device in terms of coordinates, in relation to a visual map. However, the means by which the raw positioning information is obtained may vary. Offerings may include the incorporation of Global Positioning System (GPS) receivers in a device for obtaining the electronic positioning information from satellites. Further, long range wireless communication systems, such as cellular telephony, may also provide electronic positioning information through methods such as cell-based triangulation. Short-range wireless systems may be able to provide similar information through a determination of proximity of a device to a particular wireless access point.

SUMMARY

Method, apparatus, and computer program product example embodiments provide position determination.

In an example embodiment of the invention, a method comprises:

measuring, in a mobile device, acceleration of the mobile device in mutually orthogonal x and y directions in a horizontal plane and in a vertical direction, due to walking motion of a user holding the mobile device;

computing, by the mobile device, a Fourier transform of the measured acceleration of the mobile device in the vertical direction and determining a frequency of acceleration in the vertical direction having a maximum amplitude;

computing, by the mobile device, a Fourier transform of the measured acceleration of the mobile device in the x direction and in the y direction and determining a frequency of acceleration in the x direction and a frequency of acceleration in the y direction corresponding to the maximum amplitude frequency of acceleration in the vertical direction; and computing, by the mobile device, a direction of walking motion of the user, based on the determined frequency of acceleration in the x direction and the frequency of acceleration in the y direction corresponding to the maximum amplitude frequency of acceleration in the vertical direction.

In an example embodiment of the invention, a method comprises:

determining, by a positioning engine in the mobile device, whether useable signals representing Earth-fixed coordinates are available at a current location;

invoking, by the positioning engine in the mobile device, at least a first programmed application for position determination for outdoor locations when the current location has useable signals available representing Earth-fixed coordinates; and invoking, by the positioning engine in the mobile device, at least a second programmed application for position determination for indoor locations, using the computed direction of walking motion of the user, when the current location does not have useable signals available representing Earth-fixed coordinates.

In an example embodiment of the invention, a method comprises:

displaying, by a positioning engine in the mobile device, on a display of the mobile device, a map of an area near the user, oriented based on the computed direction of walking motion of the user; and adjusting, by the positioning engine in the mobile device, the displayed orientation of the map to show the direction of walking motion of the user, when orientation of the mobile device changes with respect to the direction of walking motion of the user.

In an example embodiment of the invention, a method comprises:

displaying, by a positioning engine in the mobile device, on a display of the mobile device, a current path traversed by the user on a map of an area near the user, based on the computed direction of walking motion of the user; and adjusting, by the positioning engine in the mobile device, the displayed current path traversed by the user on the map, to show the direction of walking motion of the user, when the user changes the direction of walking with respect to Earth-fixed coordinates.

In an example embodiment of the invention, a method comprises:

wherein the mobile device is a wireless communications device;

transmitting, by the mobile device, a wireless message to a remote wireless communications device, the wireless message including information related to the computed direction of walking motion of the user; and receiving, by the mobile device, a wireless reply message from the remote wireless communications device, the reply information related to the computed direction of walking motion of the user.

In an example embodiment of the invention, an apparatus comprises:

at least one processor;

at least one memory including computer program code;

the at least one memory and the computer program code configured to, with the at least one processor, cause the apparatus at least to:

measure acceleration of the apparatus in mutually orthogonal x and y directions in a horizontal plane and in a vertical direction, due to walking motion of a user holding the apparatus;

compute a Fourier transform of the measured acceleration of the apparatus in the vertical direction and determine a frequency of acceleration in the vertical direction having a maximum amplitude;

compute a Fourier transform of the measured acceleration of the apparatus in the x direction and in the y direction and determine a frequency of acceleration in the x direction and a frequency of acceleration in the y direction corresponding to the maximum amplitude frequency of acceleration in the vertical direction; and compute a direction of walking motion of the user, based on the determined frequency of acceleration in the x direction and the frequency of acceleration in the y direction corresponding to the maximum amplitude frequency of acceleration in the vertical direction.

In an example embodiment of the invention, an apparatus comprises:

the at least one memory and the computer program code configured to, with the at least one processor, cause the apparatus at least by:

determine, by a positioning engine in the apparatus, whether useable signals representing Earth-fixed coordinates are available at a current location;

invoke, by the positioning engine in the apparatus, at least a first programmed application for position determination for outdoor locations when the current location has useable signals available representing Earth-fixed coordinates; and invoke, by the positioning engine in the apparatus, at least a second programmed application for position determination for indoor locations, using the computed direction of walking motion of the user, when the current location does not have useable signals available representing Earth-fixed coordinates.

In an example embodiment of the invention, an apparatus comprises:

the at least one memory and the computer program code configured to, with the at least one processor, cause the apparatus at least to:

display, by a positioning engine in the apparatus, on a display of the apparatus, a map of an area near the user, oriented based on the computed direction of walking motion of the user; and adjust, by the positioning engine in the apparatus, the displayed orientation of the map to show the direction of walking motion of the user, when orientation of the apparatus changes with respect to the direction of walking motion of the user.

In an example embodiment of the invention, an apparatus comprises:

the at least one memory and the computer program code configured to, with the at least one processor, cause the apparatus at least to:

display, by a positioning engine in the apparatus, on a display of the apparatus, a current path traversed by the user on a map of an area near the user, based on the computed direction of walking motion of the user; and adjust, by the positioning engine in the apparatus, the displayed current path traversed by the user on the map, to show the direction of walking motion of the user, when the user changes the direction of walking with respect to Earth-fixed coordinates.

In an example embodiment of the invention, an apparatus comprises:

wherein the apparatus is a wireless communications device;

transmit, by the apparatus, a wireless message to a remote wireless communications device, the wireless message including information related to the computed direction of walking motion of the user; and receive, by the apparatus, a wireless reply message from the remote wireless communications device, the reply information related to the computed direction of walking motion of the user.

In an example embodiment of the invention, a computer program product comprises computer executable program code recorded on a computer readable non-transitory storage medium, the computer executable program code comprising:

code for measuring in a handheld mobile apparatus, acceleration of the apparatus in mutually orthogonal x and y directions in a horizontal plane and in a vertical direction, due to walking motion of a user holding the apparatus;

code for computing a Fourier transform of the measured acceleration of the apparatus in the vertical direction and determining a frequency of acceleration in the vertical direction having a maximum amplitude;

code for computing a Fourier transform of the measured acceleration of the apparatus in the x direction and in the y direction and determining a frequency of acceleration in the x direction and a frequency of acceleration in the y direction corresponding to the maximum amplitude frequency of acceleration in the vertical direction; and code for computing a direction of walking motion of the user, based on the determined frequency of acceleration in the x direction and the frequency of acceleration in the y direction corresponding to the maximum amplitude frequency of acceleration in the vertical direction.

In an example embodiment of the invention, a computer program product comprises:

code for determining, by a positioning engine in the mobile device, whether useable signals representing Earth-fixed coordinates are available at a current location;

code for invoking, by the positioning engine in the mobile device, at least a first programmed application for position determination for outdoor locations when the current location has useable signals available representing Earth-fixed coordinates; and code for invoking, by the positioning engine in the mobile device, at least a second programmed application for position determination for indoor locations, using the computed direction of walking motion of the user, when the current location does not have useable signals available representing Earth-fixed coordinates.

In an example embodiment of the invention, a computer program product comprises:

code for displaying, by a positioning engine in the mobile device, on a display of the mobile device, a map of an area near the user, oriented based on the computed direction of walking motion of the user; and code for adjusting, by the positioning engine in the mobile device, the displayed orientation of the map to show the direction of walking motion of the user, when orientation of the mobile device changes with respect to the direction of walking motion of the user.

In an example embodiment of the invention, a computer program product comprises:

code for displaying, by a positioning engine in the mobile device, on a display of the mobile device, a current path traversed by the user on a map of an area near the user, based on the computed direction of walking motion of the user; and code for adjusting, by the positioning engine in the mobile device, the displayed current path traversed by the user on the map, to show the direction of walking motion of the user, when the user changes the direction of walking with respect to Earth-fixed coordinates.

In an example embodiment of the invention, a computer program product comprises:

wherein the mobile device is a wireless communications device;

code for transmitting, by the mobile device, a wireless message to a remote wireless communications device, the wireless message including information related to the computed direction of walking motion of the user; and code for receiving, by the mobile device, a wireless reply message from the remote wireless communications device, the reply information related to the computed direction of walking motion of the user.

The example embodiments of the invention provide position determination.

DESCRIPTION OF THE FIGURES

FIG. 4 illustrates an example embodiment of the invention, depicting an example flow diagram of an example method performed by the mobile wireless device, computing a direction of walking motion of the user, based on the determined frequency of acceleration in the x direction and the frequency of acceleration in the y direction corresponding to the maximum amplitude frequency of acceleration in the vertical direction. in accordance with at least one embodiment of the present invention, in accordance with at least one embodiment of the present invention.

FIGS. 5A 5B, and 5C illustrate an example embodiment of the invention, depicting the example mobile device displaying a hallway map in a heads-up display, wherein if only the mobile wireless device turns, then both the gyros and/or magnetometers in the mobile wireless device and the accelerometer-based direction estimate will indicate the turn of the device, so that the device will continue to display the same direction of walking on the map, in accordance with at least one embodiment of the present invention.

FIGS. 6A 6B, and 6C illustrate an example embodiment of the invention, depicting the example mobile device displaying a hallway map in a heads-up display, wherein if the user turns 90 degrees, the gyros and/or magnetometers in the mobile wireless device will measure a 90 degree turn, but the accelerometer-based direction estimate will not indicate the turn, so that the device will display the user's new direction of walking on the map, in accordance with at least one embodiment of the present invention.

FIG. 7A illustrates an example embodiment of the invention, depicting the mobile device storing information on an initial position of the mobile device and computing a dead reckoning position based on the computed direction of walking motion of the user and the stored initial position of the mobile device, in accordance with at least one embodiment of the present invention. The architectural diagram shows a memory of the mobile wireless device of FIG. 1, including memory partitions to generate under program control, a fingerprint data structure representing a radiomap of a single floor area, by making radio measurements with the device at estimated locations along the path of motion over the floor area and mapping the measurements to grid nodes that are closest to the estimated locations, in accordance with at least one embodiment of the present invention. The grid nodes may be dynamically generated in real time or they may be preexisting grid templates.

DISCUSSION OF EXAMPLE EMBODIMENTS OF THE INVENTION

Figure 1:
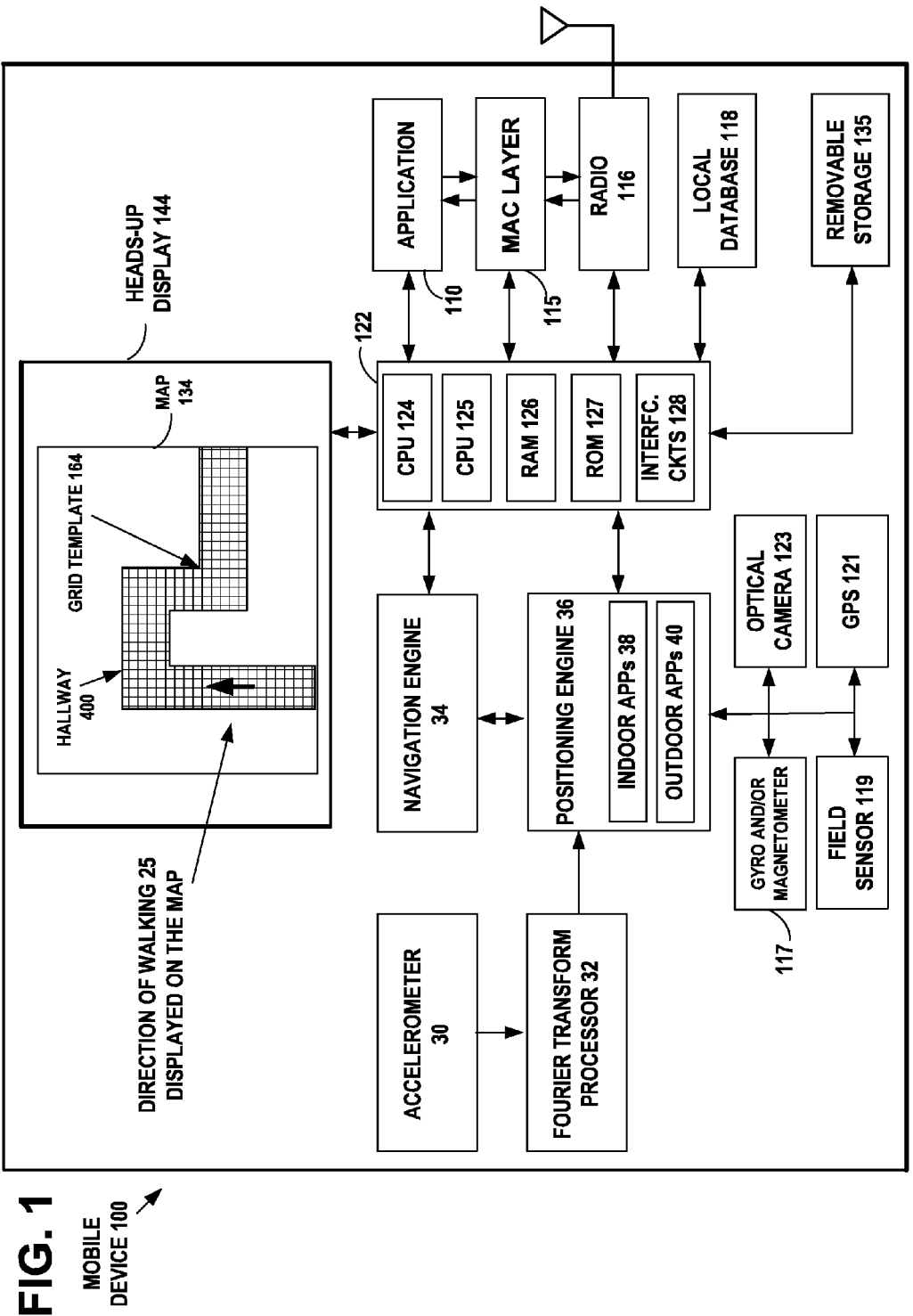
FIG. 1 illustrates an example embodiment of the invention, depicting an example architectural diagram showing a mobile device that measures acceleration of the mobile device in mutually orthogonal x and y directions in a horizontal plane and in a vertical direction, due to walking motion of a user holding the mobile device, in accordance with at least one embodiment of the present invention.

Indoor positioning and navigation may be useful applications for smartphones, to support social location-based services and advertisement use cases. In marketing and advertising, data and observations about user locations and activities in malls, shopping centers, airports and the like, may provide useful information for user behavior analysis and other statistical data products derived from crowd-sourced user data. These applications may stimulate further refinements in indoor navigation and positioning accuracy.

In accordance with an example embodiment of the invention, locations may be estimated along a path of motion of a user of the mobile wireless device, based on motion observations made by a motion sensor in the apparatus.

Clinical studies of human movement have revealed that the pattern of movement and applied force to the center of gravity of the human body while walking, is not a function of individual characteristics (Murray MP, "Gait as a total pattern of movement," in *American Journal of Physiological Medicine*, pp. 290-333, 1967.) Generally, when a human walks on a flat floor, the acceleration in the forward direction is advanced in phase by 90 degrees before the vertical acceleration. Thus, human walking behavior may be detected and measured by analyzing a time sequence of the acceleration vector while walking, without taking into consideration individual differences.

Pedestrian indoor navigation based on dead reckoning, may use motion sensors such as accelerometers, but the coordinate system of the sensor device must be referenced with respect to the pedestrian's motion. If the orientation of the sensor in the mobile wireless device held by the pedestrian, changes during walking, the direction of the acceleration measured by the sensor in its own coordinate system, is no longer the same as the actual direction of acceleration of the pedestrian in the external geo-coordinate system. An accelerometer in the mobile wireless device may correctly detect the vertical direction of gravity and thus the direction of vertical acceleration of the pedestrian's center of gravity, but the direction of walking as projected on a horizontal plane, may not be accurately measured. The term "pedestrian dead reckoning" (PDR) is the process for determining the traveled distance of a pedestrian by counting steps based on accelerometer impacts, along with an estimate of the user's step length. The direction of travel may also be included in the definition of dead reckoning, i.e. distance+direction is combined to a displacement vector and those vectors are summed.

When the user is walking, it is helpful to have a map displayed by the mobile wireless device, oriented in the "heads-up" direction so that what the user sees ahead is aligned with the displayed map. The user's the direction of walking should be correctly displayed on the map. However, if the user re-orients the mobile wireless device (longer side ahead vs. shorter side ahead, for example), but keeps walking in the same direction, the gyros and/or magnetometers in the mobile wireless device will record a 90 degree turn. This would ruin the pedestrian dead reckoning (PDR) navigation process, that generally assumes that the sensor unit in the mobile wireless device is fixed to the human body. Still further, the mobile wireless device will not know whether the user's direction of walking displayed on the map should be re-oriented, since gyro and/or magnetometer measurements are not sufficient to distinguish whether the user actually turned or whether the user merely re-oriented the mobile wireless device.

In accordance with an example embodiment of the invention, accelerometers are used to estimate the orientation between the mobile wireless device frame and user's frame during walking. Then, in accordance with an example embodiment of the invention, the pedestrian dead reckoning (PDR) algorithm is able assume that the orientation between the mobile wireless device frame and user's frame is fixed, even though their relative orientation is actually estimated by an example embodiment of the invention. In this manner, the mobile wireless device may perform pedestrian dead reckoning (PDR), even when the mobile wireless device is not fixed to the user's body.

In accordance with an example embodiment of the invention, the mobile wireless device will know whether the direction of walking displayed on the map should be re-oriented, by distinguishing whether the user actually turned or whether the user merely re-oriented the mobile wireless device. For example, if the user turns, the gyros and/or magnetometers in the mobile wireless device will measure a 90 degree turn, but the accelerometer-based direction estimate will not indicate the turn, so that the invention will display the user's new direction of walking on the map. If only the mobile wireless device turns, then both the gyros and/or magnetometers in the mobile wireless device and the accelerometer-based direction estimate will indicate the turn of the device, so that the invention will continue to display the same direction of walking on the map. Thus, embodiments of the invention may make inferences that enable both pedestrian dead reckoning (PDR) and orientating the direction of walking displayed on the map on the screen.

In accordance with an example embodiment of the invention, the both measurements of the gyros and/or magnetometers in the mobile wireless device and the accelerometer-based direction estimate are fed into a positioning engine in the mobile wireless device that determines whether the user's direction of walking has changed or whether the user has merely re-oriented the mobile wireless device. In accordance with an example embodiment of the invention, other available measurements from field sensors, ambient radio beacon signals, global positioning system (GPS) measurements, and visual scene information may be fed into the positioning engine, along with the measurements of the gyros and/or magnetometers in the mobile wireless device and the accelerometer-based direction estimate.

In accordance with an example embodiment of the invention, programmed applications associated with the positioning engine in the mobile wireless device may provide position determination for either outdoor locations where GPS signals are available or for indoor locations where measurements of the gyros and/or magnetometers and the accelerometer-based direction estimate may be combined with other available measurements from field sensors, ambient radio beacon signals, and visual scene information. In accordance with an example embodiment of the invention, the positioning engine in the mobile wireless device may select either an outdoor position determining application or an indoor position determining application, whichever is the best for that location.

In accordance with an example embodiment of the invention, pedestrian dead reckoning (PDR) may be used in indoor locations to establish the user's location after making a traverse or trip, wherein the user establishes an initial position at the starting point by means of a visual image of an initial landmark, a radio beacon, or a GPS measurement at the starting point. The user measures the distance of each consecutive segment traversed while in motion during his trip and the bearing or angle of each segment with respect to a known coordinate system, such as the geo-magnetic coordinate system. The average length of the user's stride may be measured while the user is initially outdoors where GPS signals are available. The length of each segment traversed is the sum of the user's steps times the average length of the stride. Typically, the known coordinate system is an external reference system, such as the geo-magnetic system, as measured with a magnetic compass. In accordance with an example embodiment of the invention, a navigation engine, in association with the positioning engine, in the mobile wireless device may position the consecutive traversed segments on a map, head to tail, starting at the known initial position, with each segment oriented at its respective bearing, the current location of the user may be found. The map may be displayed to the user on the mobile wireless device.

In accordance with an example embodiment of the invention, pedestrian dead reckoning (PDR) may be performed without using a magnetic compass and an external reference coordinate system while in motion during the trip. The navigation engine, in association with the positioning engine, may measure consecutive bearings of the segments with respect to the accelerometer sensor's local coordinate system, while in motion during the trip. The user still establishes an initial position at the starting point with respect to an external reference coordinate system, for example by means of an initial landmark. The user also establishes the initial orientation of the accelerometer sensor's local coordinate system with respect to the orientation of the external reference coordinate system, for example by making the orientation of the two coordinate systems identical at the start or the trip. Then, while in motion during the trip, the navigation engine, in association with the positioning engine, measures the distance of each consecutive segment while in motion during the trip and the bearing or angle of each segment traversed with respect to the accelerometer sensor's local coordinate system. The navigation engine, in association with the positioning engine, positions the consecutive segments on a map, head to tail, starting at the known initial position, with each segment oriented at its respective bearing with respect to the accelerometer sensor's local coordinate system. Since the orientation of the local coordinate system with respect to the orientation of the external reference coordinate system, is known, the current location of the user may be found by the navigation engine, in association with the positioning engine.

In accordance with an example embodiment of the invention, the distance traversed by the user in a segment may be measured by the navigation engine, in association with the positioning engine. The traveler's speed is the time rate of change of the traveler's position. The speed of the user may be measured while traversing the segment. If the segment is small so that the speed remains relatively constant, the distance traversed by the user in the segment may be computed as the measured speed divided by the duration required for traversing the segment. The user's velocity is a vector having the speed as its magnitude and the user's direction of travel in the segment expressed by the components of the velocity along the x,y coordinates of the reference system in which it is measured.

The accelerometer in the mobile wireless device is an electromechanical device that measures static or dynamic forces due to the acceleration of a mass in the device. Example accelerometers may use piezoelectric effect crystal structures that generate a voltage in response to accelerative forces. Other example accelerometers may use variations in the capacitance between two microstructures that generate a voltage in response to accelerative forces.

In accordance with an example embodiment of the invention, the direction of motion of the user may measured by the positioning engine, by analyzing the horizontal components of the sensor's acceleration in the frequency domain.

Figure 2:
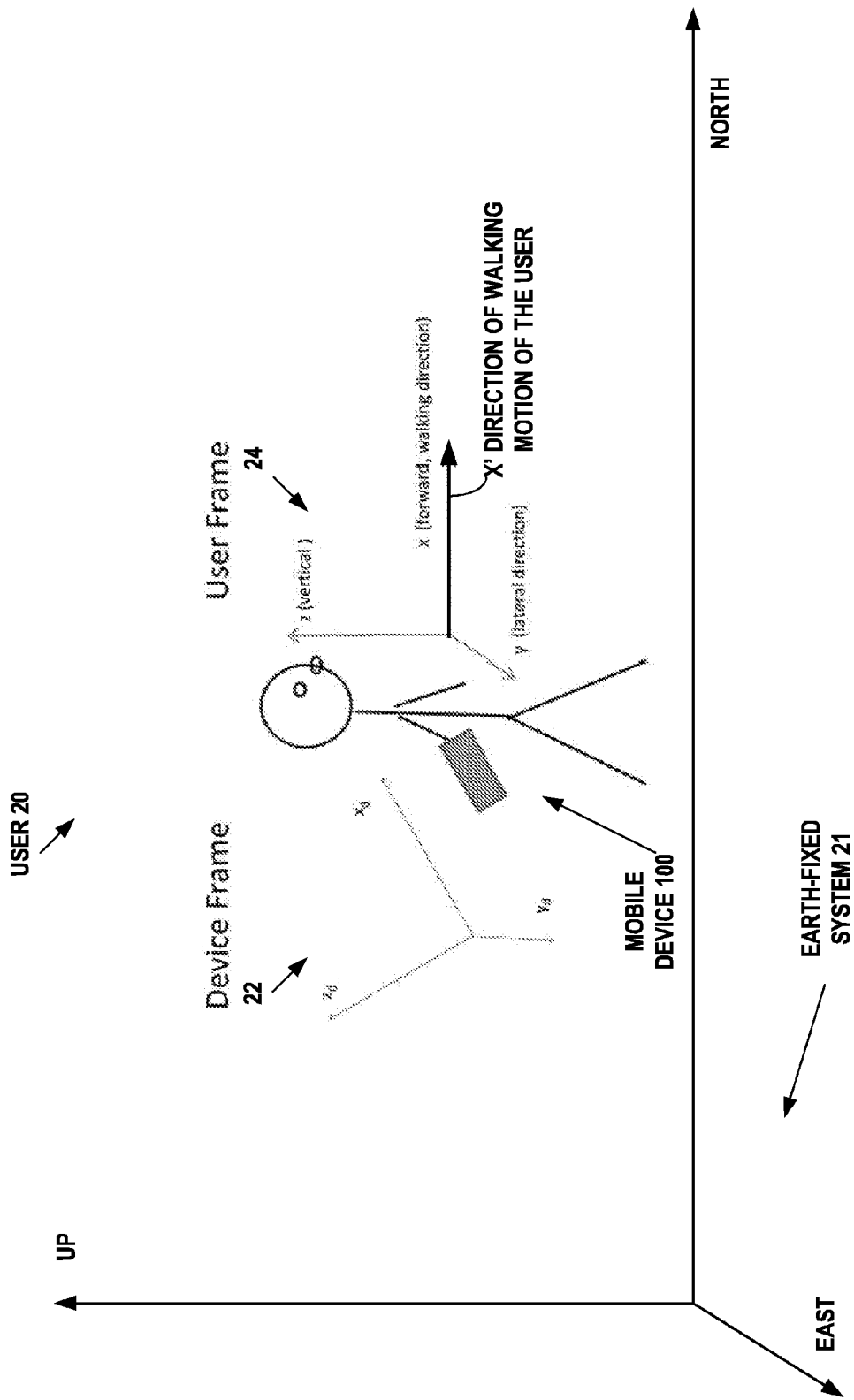
FIG. 2 illustrates an example embodiment of the invention, depicting a user's walking frame (x,y,z), where the x-axis is the direction of the user's travel, the mobile device frame (xd,yd,zd) in which the accelerometer sensor's measurements are performed, and the Earth-fixed coordinate system (North,East,Up), in accordance with at least one embodiment of the present invention.
Figure 3:
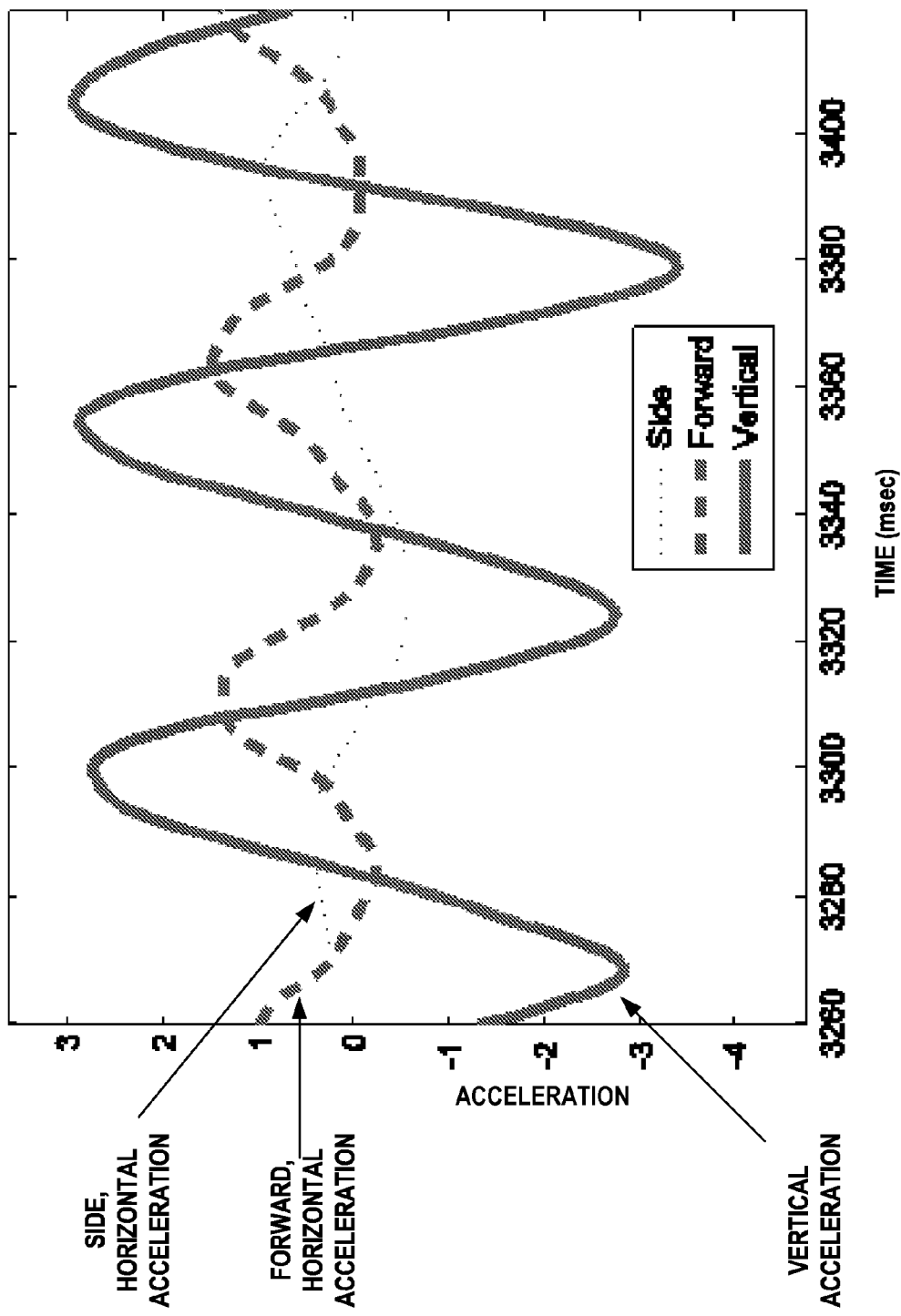
FIG. 3 illustrates an example embodiment of the invention, depicting when a human walks on a flat floor, the acceleration in the forward, horizontal direction is advanced in phase by 90 degrees before the vertical acceleration, in accordance with at least one embodiment of the present invention.

In accordance with an example embodiment of the invention, the example mobile device 100 shown in FIG. 1, the accelerometer 30 measures acceleration of the mobile wireless device in mutually orthogonal x and y directions in a horizontal plane and in a vertical direction, due to walking motion of a user 20 holding the mobile device. FIG. 2 is an example illustration of a user's walking frame (x,y,z) 24, where the x-axis is the direction of the user's travel, and the mobile device frame (xd,yd,zd) 22 in which the accelerometer 30 measurements are performed. The Earth-fixed coordinate system (North,East,Up), is also shown and the user's direction of walking is referenced with respect to the Earth-fixed coordinate system. The East, North, Up coordinates are but one example of an indoor co-ordinate system. The user may also use information in a building map. Generally, when a human walks on a flat floor, the acceleration in the forward, horizontal direction is advanced in phase by 90 degrees before the vertical acceleration, as shown in FIG. 3.

In accordance with an example embodiment of the invention, the direction of walking motion x' of the user may be determined by the positioning engine 36 based on a determined frequency of acceleration in the x direction and frequency of acceleration in the y direction corresponding to a maximum amplitude frequency of acceleration in the vertical direction.

In accordance with an example embodiment of the invention, the gravity vector may be removed from the data by the positioning engine 36. Then, in accordance with an example embodiment of the invention, the transformed accelerometer 30 readings may be processed by the mobile device 100 as follows:

Window the data using N number of steps (e.g. N=4).

Use Hanning window to:

Compute the Discrete Fourier Transform (DFT) of the vertical component z of accelerometer 30 data with the Fourier transform processor 32 and find the point v which has the highest peak in the frequency spectrum (frequency should be around feasible walking frequencies) with the positioning engine 36. The Discrete Fourier Transform (DFT) may be computed, for example, by computing the Fast Fourier Transform (FFT) with the Fourier transform processor 32.

Compute the DFT from both the horizontal components in the x and y directions of accelerometer 30 data, with the Fourier transform processor 32, and find the corresponding points x and y where the vertical component has a maximum frequency, with the positioning engine 36.

Rotate horizontal points 180 degrees with 1 degree interval with the positioning engine 36 and find the index that has maximum absolute value of the rotated x values, $$k = \underset{i=1 \ldots 180}{\mathrm{argmax}}\left(\left|\left[\cos\frac{i\pi}{180} \ -\sin\frac{i\pi}{180}\right]\left[\begin{array}{c}x\\y\end{array}\right]\right|\right),$$

where [,] is absolute value of a complex number.
Then the forward (backward) component x' is $$\left[\begin{array}{c}x'\\y'\end{array}\right] = \left[\begin{array}{cc}\cos\frac{k\pi}{180} & -\sin\frac{k\pi}{180}\\ \sin\frac{k\pi}{180} & \cos\frac{k\pi}{180}\end{array}\right]\left[\begin{array}{c}x\\y\end{array}\right]$$

If phase θ of the signal x'−v

θ=arctan(imag(x'−v),real(x'−v))

is positive forward direction is k degrees otherwise direction is k+180 degrees (and forward component is −x').

Then the forward (backward) component x' may be output by the positioning engine 36 to the navigation engine 34 for computing the user's location by pedestrian dead reckoning (PDR).

The figure illustrates an example embodiment of the invention, depicting an example architectural diagram of the mobile wireless device 100 that measures acceleration of the mobile device in mutually orthogonal x and y directions in a horizontal plane and in a vertical direction, due to walking motion of a user holding the mobile device, in accordance with at least one embodiment of the present invention.

In accordance with an example embodiment of the invention, the mobile wireless device 100 may always be location aware, so that it may detect when the device is entering a building, leaving the building or changing the floor inside the building. Building entry or exit may be done with rather coarse location information. Location information may be obtained in real-time from gyros and/or magnetometers 117, WiFi/Cell-ID/Bluetooth radio measurements using the radio 116, and/or from GPS or Global Navigation Satellite System (GNSS) signals using the GPS module 121, and/or from sensing ambient magnetic or electric fields using the field sensor 119, and/or from sensing the ambient light level using the optical camera 123, and/or from sensing motion using the accelerometer 30.

The accelerometer 30 in the mobile device 100, may be an electromechanical accelerometer that measures static or dynamic forces due to the acceleration of a mass in the device. The accelerometer 30 may use piezoelectric effect crystal structures that generate a voltage in response to accelerative forces. Other examples of accelerometer 30 may use variations in the capacitance between two microstructures that generate a voltage in response to accelerative forces.

The Fourier transform processor 32, positioning engine 36, and navigation engine 34 may be embodied in the mobile wireless device 100 as hardware modules, firmware, or software stored in the RAM 126, ROM 127 or removable storage 135, or any combination thereof.

In accordance with an example embodiment of the invention, the both measurements of the gyros and/or magnetometers 117 in the mobile wireless device and the Discrete Fourier Transform (DFT) of the accelerometer 30 data are fed into the positioning engine 36 in the mobile wireless device 100 that determines whether the user's direction of walking has changed or whether the user has merely reoriented the mobile wireless device. In accordance with an example embodiment of the invention, other available measurements from field sensors 119, ambient radio beacon signals received by the radio 116, global positioning system (GPS) measurements by the GPS 121, and visual scene information received by camera 123, may be fed into the positioning engine 36, along with the measurements of the gyros and/or magnetometers 117 in the mobile wireless device 100 and the Discrete Fourier Transform (DFT) of the accelerometer 30 data.

In accordance with an example embodiment of the invention, programmed applications 38 and 40 associated with the positioning engine 36 in the mobile wireless device 100 may provide position determination. The positioning engine 36 may invoke outdoor applications (apps) 40 for outdoor locations where useable GPS signals are available. The positioning engine 36 may invoke indoor applications (apps) 38 for indoor locations where useable GPS signals are not available, where measurements of the gyros and/or magnetometers 117 and the Discrete Fourier Transform (DFT) of the accelerometer 30 data may be combined with other available measurements from field sensors 119, ambient radio beacon signals in radio 116, and visual scene information in camera 121. In accordance with an example embodiment of the invention, the positioning engine 36 in the mobile wireless device 100 may select either an outdoor position determining application 40 or an indoor position determining application 38, whichever is the best for that location.

In accordance with an example embodiment of the invention, pedestrian dead reckoning (PDR) may be computed by the navigation engine 34, in indoor locations to establish the user's location after making a traverse or trip, wherein the user establishes an initial position at the starting point by means of a visual image of an initial landmark using camera 123, a radio beacon using radio 116, or a GPS measurement using GPS sensor 121 at the starting point. The positioning engine 36 measures the distance of each consecutive segment traversed while in motion during the trip. The positioning engine 36 measures bearing or angle of each segment with respect to a known coordinate system 21, such as the geo-magnetic coordinate system, using the gyro and/or magnetometer 117 and the Discrete Fourier Transform (DFT) of the accelerometer 30 data. The average length of the user's stride may be measured while the user is initially outdoors where GPS signals are available. The length of each segment traversed is the sum of the user's steps times the average length of the stride. Typically, the known coordinate system is an external reference system, such as the geo-magnetic system, as measured with the magnetometer 117. In accordance with an example embodiment of the invention, the navigation engine 34, in association with the positioning engine 36, in the mobile wireless device 100 may position the consecutive traversed segments on a map 134, head to tail, starting at the known initial position, with each segment oriented at its respective bearing, the current location of the user may be found. The map 134 may be displayed in a heads-up display 144 to the user on the mobile wireless device 100.

In accordance with an example embodiment of the invention, pedestrian dead reckoning (PDR) may be performed without using a magnetic compass and an external reference coordinate system while in motion during the trip, using the Discrete Fourier Transform (DFT) of the accelerometer 30 data. The navigation engine 34, in association with the positioning engine 36, may measure consecutive bearings of the segments with respect to the accelerometer 30 local coordinate system, while in motion during the trip. The user still establishes an initial position at the starting point with respect to an external reference coordinate system 21, for example by means of an initial landmark. The user also establishes the initial orientation of the accelerometer sensor's local coordinate system 22 with respect to the orientation of the external reference coordinate system 21, for example by making the orientation of the two coordinate systems identical at the start or the trip. Then, while in motion during the trip, the navigation engine 34, in association with the positioning engine 36, measures the distance of each consecutive segment while in motion during the trip and the bearing or angle of each segment traversed with respect to the accelerometer sensor's local coordinate system 22 using the Discrete Fourier Transform (DFT) of the accelerometer 30 data. The navigation engine 34, in association with the positioning engine 36, positions the consecutive segments on a map 134, head to tail, starting at the known initial position, with each segment oriented at its respective bearing with respect to the accelerometer sensor's local coordinate system 22. Since the orientation of the local coordinate system 22 with respect to the orientation of the external reference coordinate system 21, is known, the current location of the user may be found by the navigation engine 34, in association with the positioning engine 36.

In accordance with an example embodiment of the invention, the distance traversed by the user in a segment may be measured by the navigation engine 34, in association with the positioning engine 36. The traveler's speed is the time rate of change of the traveler's position. The speed of the user may be measured while traversing the segment. If the segment is small so that the speed remains relatively constant, the distance traversed by the user in the segment may be computed as the measured speed divided by the duration required for traversing the segment. The user's velocity is a vector having the speed as its magnitude and the user's direction of travel in the segment expressed by the components of the velocity along the x,y coordinates of the reference system in which it is measured.

Acceleration is the time rate of change of the user's velocity or the time rate of change of the time rate of change of the distance traveled. The acceleration of the user may be measured by the accelerometer in the mobile wireless device while traversing the segment. If the segment is small so that the acceleration remains relatively constant, the computed velocity may be the measured acceleration divided by the duration required for traversing the segment. The user's acceleration is a vector having the magnitude of the acceleration and the user's direction of acceleration in the segment expressed as the components of the acceleration along the x,y coordinates of the reference system in which it is measured. Then, the distance traversed by the user in the segment may be computed by the navigation engine, in association with the positioning engine, as the computed velocity divided by the duration required for traversing the segment.

The accelerometer 30 in the mobile wireless device is an electromechanical device that measures static or dynamic forces due to the acceleration of a mass in the device. Example accelerometers may use piezoelectric effect crystal structures that generate a voltage in response to accelerative forces. Other example accelerometers may use variations in the capacitance between two microstructures that generate a voltage in response to accelerative forces.

In accordance with an example embodiment of the invention, the direction of motion of the user may measured by the positioning engine 36, by analyzing the horizontal components of the device's acceleration in the frequency domain, using the Discrete Fourier Transform (DFT) of the accelerometer 30 data.

In accordance with an example embodiment of the invention, the positioning engine 36 in device 100 may determine a current relative position of the device 100 with respect to the plurality of wireless access point devices whose signals are received by the radio 116. The positioning engine 36 may calculate relative positions of the device 100 based on received signal strengths, triangulation based on the direction of the received signal, triangulation based on both direction and signal strength of received signals, and other relative positioning methods such as proximity algorithms or other deterministic algorithms. The positioning engine 36 may calculate relative positions of the device 100 based on pattern recognition of the received signals, matching the received pattern with stored patterns that are associated with known geographic locations, in a technique known as "fingerprinting". Pattern data is collected describing an access point observed at a location and this pattern data is later processed to find a match with a corresponding reference pattern for that location out of many possible reference patterns for locations. Combinations of measurements from two or more types of sensors and the Discrete Fourier Transform (DFT) of the accelerometer 30 data, may have their signals combined by the positioning engine 36 into an input metadata vector that characterizes a composite sampling event. The composite sampling event can be recognized using the principles of Hidden Markov Modeling (HMM).

In accordance with an example embodiment of the invention, the mobile wireless device 100 of FIG. 1 includes processor 122 that may access random access memory RAM 126 and/or read only memory ROM 127 in order to obtain stored program code and data for use during processing. RAM 126 or ROM 127 may generally include removable or imbedded memories that operate in a static or dynamic mode. Further, RAM 126 or ROM 127 may include rewritable memories such as Flash, EPROM, etc. Examples of removable storage media based on magnetic, electronic and/or optical technologies such as magnetic disks, optical disks, semiconductor memory circuit devices, and micro-SD memory cards are shown at 135 and in FIG. 8, and may serve, for instance, as a program code and data input/output means. Code may include any interpreted or compiled computer language including computer-executable instructions. The code and/or data may be used to create software modules such as operating systems, communication utilities, user interfaces, more specialized program modules, etc.

In accordance with an example embodiment of the invention, wireless local area networks (WLANs) are an example environment that may be used in the example embodiments of the invention. However, example embodiments of the invention are applicable to other environments as well, for example cellular systems such as Global System for Mobile Communications (GSM), Wideband Code Division Multiple Access (W-CDMA), High Speed Packet Access (HSPA), Long Term Evolution (LTE), LTE Advanced (LTE-A), International Mobile Telecommunications Advanced (IMT-A), CDMA, Wireless Metropolitan Area Networks (WMAN) and Broadband Fixed Access (BWA) (LMDS, WiMAX, AIDAAS and HiperMAN), or the like networks, as well as short range networks such as Bluetooth, Zigbee, IEEE 802.11, Digital Enhanced Cordless Telecommunications (DECT), HiperLAN, Radio Frequency Identification (RFID), Wireless USB, DSRC (Dedicated Short Range Communications), Near Field Communication, wireless sensor networks, EnOcean; TransferJet, Ultra-wideband (UWB from WiMedia Alliance), WLAN, WiFi, and HiperLAN. WLAN discovery mechanisms include passive and active scanning A device or station that uses the discovery mechanisms is said to be in discovery state. In the passive scanning mode, a device or station in the discovery state listens to a channel for no longer than an interval determined for the scan. In practice, the passively scanning device looks for beacon frames from any wireless networks or representatives of wireless networks or alternatively beacon frames that meet a given criterion, such as a device address or network ID. When a device in the discovery state uses the active scanning, it generates probe request frames and transmits them to request APs to reply with probe response frames, as discovery responses, providing requested information.

In accordance with an example embodiment of the invention, the mobile wireless device 100 may be, for example, a miniature device such as a key fob, smart card, jewelry, or the like. The mobile wireless device 100 may be, for example, a larger device such as a cell phone, smart phone, flip-phone, PDA, graphic pad, or even larger devices such as a laptop computer, an automobile dashboard, and the like.

FIG. 2 illustrates an example embodiment of the invention, depicting a user's 20 walking frame (x,y,z) 24, where the x-axis is the direction of the user's travel, and the mobile device frame (xd,yd,zd) 22 in which the accelerometer sensor's measurements of the mobile device 100 are performed, and the Earth-fixed coordinate system (North,East, Up), n accordance with at least one embodiment of the present invention. The East, North, Up coordinates are but one example of an indoor co-ordinate system. The user may also use information in a building map showing, for example, hallways and landmarks.

FIG. 3 illustrates an example embodiment of the invention, depicting when a human walks on a flat floor, the acceleration in the forward, horizontal direction x is advanced in phase by 90 degrees before the vertical acceleration z, in accordance with at least one embodiment of the present invention.

FIG. 4 illustrates an example embodiment of the invention, depicting an example flow diagram 200 of an example method performed by the mobile wireless device 100, computing a direction of walking motion of the user, based on the determined frequency of acceleration in the x direction and the frequency of acceleration in the y direction corresponding to the maximum amplitude frequency of acceleration in the vertical direction. in accordance with at least one embodiment of the present invention, in accordance with at least one embodiment of the present invention. The steps of the flow diagram represent computer code instructions stored in the RAM and/or ROM memory of the device, which when executed by the central processing units (CPU) 124 and/or 125, carry out the functions of the example embodiments of the invention. The steps may be carried out in another order than shown and individual steps may be combined or separated into component steps. The flow diagram has the following steps:

Step 202: measuring, in a mobile device, acceleration of the mobile device in mutually orthogonal x and y directions in a horizontal plane and in a vertical direction, due to walking motion of a user holding the mobile device;

Step 204: computing, by the mobile device, a Fourier transform of the measured acceleration of the mobile device in the vertical direction and determining a frequency of acceleration in the vertical direction having a maximum amplitude;

Step 206: computing, by the mobile device, a Fourier transform of the measured acceleration of the mobile device in the x direction and in the y direction and determining a frequency of acceleration in the x direction and a frequency of acceleration in the y direction corresponding to the maximum amplitude frequency of acceleration in the vertical direction; and Step 208: computing, by the mobile device, a direction of walking motion of the user, based on the determined frequency of acceleration in the x direction and the frequency of acceleration in the y direction corresponding to the maximum amplitude frequency of acceleration in the vertical direction.

FIGS. 5A 5B, and 5C illustrate an example embodiment of the invention, depicting the example mobile wireless device 100 displaying a hallway map 134 in a heads-up display 144, wherein if only the mobile wireless device 100 turns, then both the gyros and/or magnetometers 117 in the mobile wireless device and the accelerometer 30-based direction estimate will indicate the turn of the device 100, so that the device 100 will continue to display the same direction of walking 25 on the map 134, in accordance with at least one embodiment of the present invention. The display is optional if the system is offering the user "turn by turn" navigation instructions.

FIGS. 6A 6B, and 6C illustrate an example embodiment of the invention, depicting the example mobile wireless device 100 displaying a hallway map 134 in a heads-up display 144, wherein if the user turns 90 degrees, the gyros and/or magnetometers 117 in the mobile wireless device will measure a 90 degree turn, but the accelerometer 30-based direction estimate will not indicate the turn, so that the device 100 will display the user's new direction of walking 25 on the map 134, in accordance with at least one embodiment of the present invention. The display is optional if the system is offering the user "turn by turn" navigation instructions.

FIG. 7A illustrates an example embodiment of the invention, depicting the mobile device 100 storing information on an initial position of the mobile device and computing a dead reckoning position based on the computed direction of walking motion of the user and the stored initial position of the mobile device, in accordance with at least one embodiment of the present invention. The mobile device 100 may perform dead reckoning navigation using the Discrete Fourier Transform (DFT) of the accelerometer 30 data. This may be accomplished by measuring consecutive bearings of the segments L1, L2, L3, L4, L5, with respect to the mobile device's 100 local coordinate system, the mobile device frame (xd,yd,zd) 22, while in motion during the trip. The user may establish an initial position at the starting point with respect to an external reference coordinate system, for example by means of an initial landmark. The user may also establish the initial orientation of the mobile device's 100 mobile device frame (xd,yd,zd) 22 with respect to the orientation of the external reference coordinate system, for example by making the orientation of the two coordinate systems identical at the start or the trip using a magnetic compass. Then, while in motion during the trip, the user measures the distance of each consecutive segment L1, L2, L3, L4, L5 while in motion during his trip and the bearing or angle of each segment traversed with respect to the mobile device's 100 mobile device frame (xd,yd,zd) 22 using the Discrete Fourier Transform (DFT) of the accelerometer 30 data. The mobile device 100 positions the consecutive segments L1, L2, L3, L4, L5 on a map 134 in memory, head to tail, starting at the known initial position, with each segment oriented at its respective bearing with respect to the mobile device's 100 mobile device frame (xd,yd,zd) 22. Since the orientation of the mobile device's frame (xd,yd,zd) 22 with respect to the orientation of the external reference coordinate system, is known, the current location of the user may be found.

The distance traversed by the user in a segment may be measured by direct observation of the distance traversed. The user's speed is the time rate of change of the user's position. The speed of the user may be measured while traversing the segment. If the segment is small so that the speed remains relatively constant, the distance traversed by the user in the segment may be computed as the measured speed divided by the duration required for traversing the segment. The user's velocity is a vector having the speed as its magnitude and the user's direction of travel in the segment expressed by the components of the velocity along the x,y coordinates of the reference system in which it is measured.

The user's acceleration is the time rate of change of the user's velocity or the time rate of change of the time rate of change of the distance traveled. The acceleration of the user may be measured while traversing the segment. If the segment is small so that the acceleration remains relatively constant, the computed velocity may be the measured acceleration divided by the duration required for traversing the segment. The user's acceleration is a vector having the magnitude of the acceleration and the user's direction of acceleration in the segment expressed as the components of the acceleration along the x,y coordinates of the reference system in which it is measured. Then, the distance traversed by the user in the segment may be computed as the computed velocity divided by the duration required for traversing the segment. In accordance with an example embodiment of the invention, the direction of motion of the user may be measured by analyzing the horizontal components of the mobile device's 100 acceleration in the frequency domain.

The figure shows the memory 126 of the mobile device 100 of FIG. 1, including memory partitions to generate under program control, a fingerprint data structure representing a radiomap of a single floor area, by making radio measurements with the device at estimated locations along the path of motion over the floor area and mapping the measurements to grid nodes that are closest to the estimated locations, in accordance with at least one embodiment of the present invention. The grid nodes may be dynamically generated in real time or they may be preexisting grid templates.

The figure illustrates a memory, for example RAM 126, of the mobile wireless device 100 of FIG. 1, including memory partitions 134, 136, 138, and 142 to generate under program control, a fingerprint data structure 172 representing a radiomap 168 of a single floor area, by making radio measurements with the device 100 at estimated locations along the path of motion 166 over the floor area and mapping the measurements to grid nodes of a grid template 164 that are closest to the estimated locations, in accordance with at least one embodiment of the present invention. The grid nodes may be dynamically generated in real time or they may be preexisting grid templates.

In accordance with an example embodiment of the invention, the mobile wireless device 100 generates in the memory partition 164, an empty grid template 164 of grid nodes representing one or more floor areas, including hallway 400, in an enclosed space, based on a map of the enclosed space. The grid is fixed to global coordinates, for example having a 0.05 micro-degree resolution. The indoor radio measurements are mapped, for example, to the closest grid node instead of to their measured or estimated coordinates. The grid nodes may be dynamically generated on an as-needed basis that may allow for expansion.

An example of dynamic generation of grid nodes referenced to global coordinates, may make reference to a preexisting map of the hallway 400. The preexisting map may be represented by map data in the local database 118 that specifies the global coordinates of the walls and floor of the hallway 400. The global coordinates may be in units of micro degrees of latitude, micro degrees of longitude, and meters or centimeters of elevation above a datum, such as mean sea level. As the mobile wireless device 100 enters the hallway 400 from outside, it records the global coordinates at the hallway entrance, using the GPS 121. Then, as the mobile wireless device 100 traverses the hallway 400, it estimates path locations L, based on the GPS reading at the entrance, the motion observations made by the accelerometer 30 in the mobile wireless device 100, and the preexisting map of the hallway 400. The preexisting map provides limits in values of global coordinates that may exist within the hallway space. The estimated path locations L are then mapped dynamically, in real time, to the closest grid nodes of the walls and floor of the hallway 400.

In accordance with an example embodiment of the invention, the mobile wireless device 100 estimates in the memory partition 136, locations along a path of motion 166 of a user of the mobile wireless device traversing the one or more floor areas, including hallway 400, based on motion observations made by the accelerometer 30 and computation of the Discrete Fourier Transform (DFT) of the accelerometer 30, in the mobile wireless device 100. User track inside the building is estimated from the sensor measurements and with the indoor map constraints. The motion or position of the user is tracked on the grid. The position may be calculated real-time or it may also be estimated afterwards from the buffered or stored measurements, once a reference location measurement is done, for example, when exiting the building.

In accordance with an example embodiment of the invention, the mobile wireless device 100 generates in the memory partition 138 a radiomap 168 of the one or more floor areas by making radio measurements with the radio 116 of the mobile wireless device, at the estimated locations along the path of motion 166, and mapping the measurements to grid nodes of the grid template 164 that are closest to the estimated locations.

In accordance with an example embodiment of the invention, the mobile wireless device 100 compiles in the memory partition 142, a fingerprint data structure 172 of the radiomap 168, including observation elements representing the radio measurements at the mapped grid nodes.

In accordance with an example embodiment of the invention, the fingerprint data structure 172 may be organized with the following file format shown in Table 1:

TABLE 1

FILE
    Header - FLOOR ID 1
        Fingerprint GRID NODE (1) 1: X1,Y1,Z1
            OBSERVATION (1)(1)1: S1
            OBSERVATION (1)(1)2: F1
            OBSERVATION (1)(1)3: V1
                :
        Fingerprint GRID NODE (1) 3: X3,Y3,Z3
            OBSERVATION (1)(3)1: S3

TABLE 1-continued

OBSERVATION (1)(3)2: F3
:
Fingerprint GRID NODE (1) 5: X5,Y5,Z5
OBSERVATION (1)(5)1: S5
OBSERVATION (1)(5)2: F5

The estimated path locations L determined from the Discrete Fourier Transform (DFT) of the accelerometer 30, are approximated by the X,Y,Z global coordinates of the closest grid node G, for example X1,Y1,Z1, and are expressed in the fingerprint identification line "Fingerprint GRID NODE (1) 1: X1,Y1,Z1". The representation of the grid nodes may be presented in a data compacted format, for example, table indices, run-length encoding or the like, as well as directly in global X,Y,Z grid units.

The radio measurement (S) made by radio 116 at the estimated path location L1, for example radio measurement S1, is mapped to the closest grid node X1,Y1,Z1, and is expressed in the observation line "OBSERVATION (1)(1)1: S1".

The field measurements (F), such as magnetic field measurements, made by field sensor 119 at the estimated path location L1, for example radio measurement F1, is mapped to the closest grid node X1,Y1,Z1, and is expressed in the observation line "OBSERVATION (1)(1)2: F1".

The visual measurements (V), such as light level, made by optical camera 123, at the estimated path location L1, for example visual measurement V1, is mapped to the closest grid node X1,Y1,Z1, and is expressed in the observation line "OBSERVATION (1)(1)3: V1".

Figure 7B:
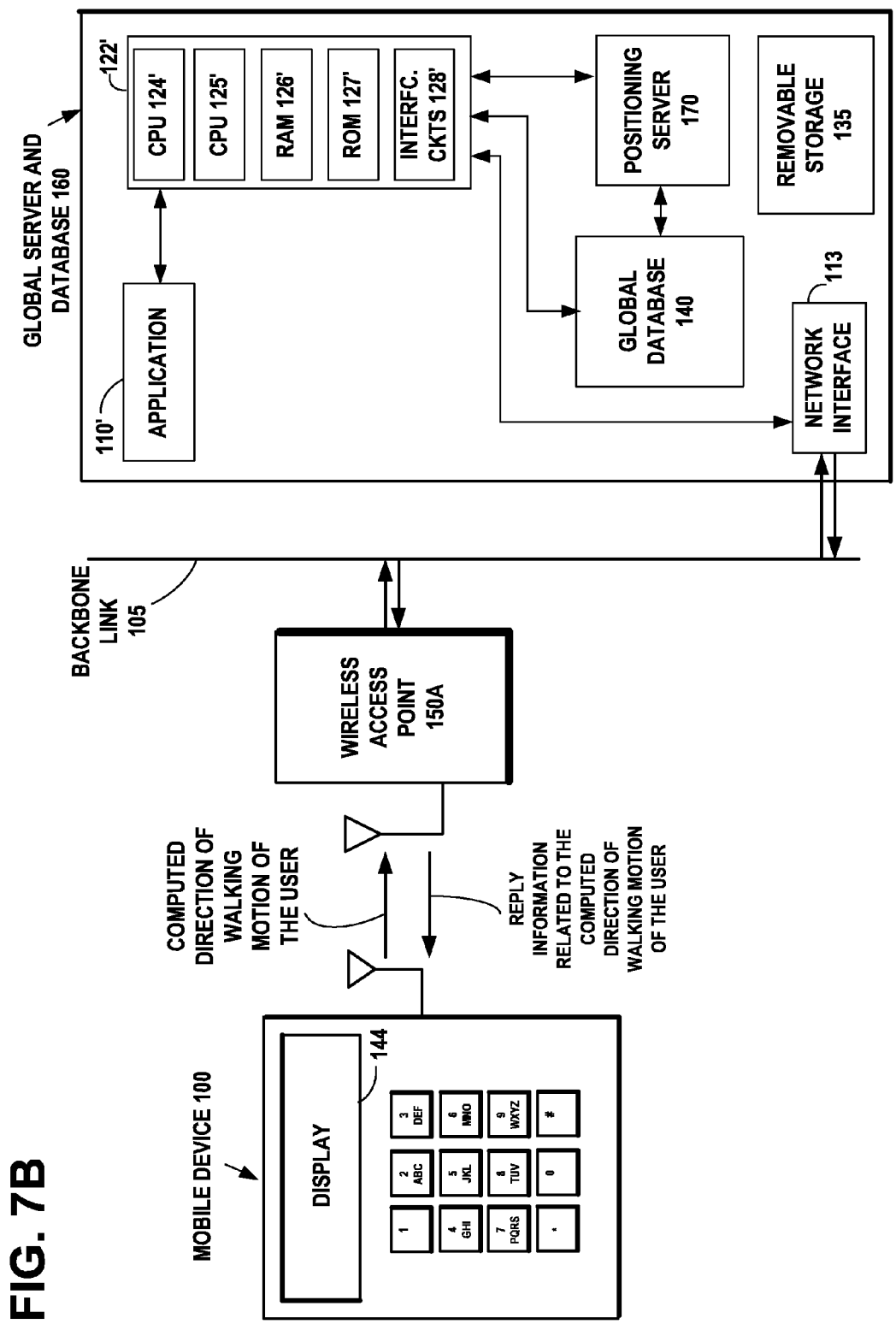
FIG. 7B illustrates an example embodiment of the invention, depicting an example network and architectural diagram showing a mobile wireless device transmitting a wireless message to a remote wireless communications device, the wireless message including information related to the computed direction of walking motion of the user, and receiving a wireless reply message from the remote wireless communications device, the reply information related to the computed direction of walking motion of the user, in accordance with at least one embodiment of the present invention.

FIG. 7B illustrates an example embodiment of the invention, depicting an example network and architectural diagram showing a mobile wireless device 100 transmitting a wireless message to a remote wireless communications device 150A, the wireless message including information related to the computed direction of walking motion of the user, and receiving a wireless reply message from the remote wireless communications device, the reply information related to the computed direction of walking motion of the user, in accordance with at least one embodiment of the present invention.

The figure illustrates an example embodiment of the invention, depicting an example network diagram showing a global server 160 receiving a fingerprint data structure 172 representing a radiomap 168 of floor areas in one or more stories of a multistory building, received from the mobile wireless device 100, for combining at the server 160 the radiomap 168 with other radiomaps of the floor areas, received from other mobile wireless devices, to generate a representation of a crowd-sourced fingerprint data structure for storage in the global database 140, in accordance with at least one embodiment of the present invention. The representation of the grid nodes may be presented in a data compacted format, for example, table indices, run-length encoding or the like, as well as directly in global X,Y,Z grid units.

In an example embodiment of the invention, the positioning server and database 160 of FIG. 7B includes processor 122' that may access random access memory RAM 126' and/or read only memory ROM 127' in order to obtain stored program code and data for use during processing. RAM 126' or ROM 127' may generally include removable or imbedded memories that operate in a static or dynamic mode. Further, RAM 126' or ROM 127' may include rewritable memories such as Flash, EPROM, etc. Examples of removable storage media based on magnetic, electronic and/or optical technologies such as magnetic disks, optical disks, semiconductor memory circuit devices, and micro-SD memory cards are shown at 135 and in FIG. 8, and may serve, for instance, as a program code and data input/output means. Code may include any interpreted or compiled computer language including computer-executable instructions. The code and/or data may be used to create software modules such as operating systems, communication utilities, user interfaces, more specialized program modules, etc.

In accordance with an example embodiment of the invention, the global server 160 receives a fingerprint data structure 172 of a radiomap 168 representing one or more floor areas in an enclosed space, from the mobile wireless device 100. The fingerprint data structure 172 includes observation elements representing radio measurements at mapped grid nodes 168 of one or more floor areas. In accordance with an example embodiment of the invention, the global server 160 combines the received radiomap 168 with radiomaps of the one or more floor areas, received from other mobile wireless devices to generate a crowd-sourced radiomap. The observation elements of the fingerprint data structure 172 are respectively combined with the observation elements of the radiomaps received from the other mobile wireless devices, to generate a crowd-sourced fingerprint data structure 172' representing the crowd-sourced radiomap. The crowd-sourced fingerprint data structure 172' representing the crowd-sourced radiomap may be stored in the global database 140. The database 140 may also be partitioned into a plurality of geographically distributed servers based in several countries. The database 140 may be running on a different server (virtual or physical) than the actual positioning server 170. In response to a request for location information received from the wireless device 100, the positioning server 170 of the global server 160 will respond and transmit the crowd-sourced fingerprint data structure 172' to the mobile wireless device 100.

The crowd-sourced fingerprint data structure 172' transmitted to the mobile wireless device 100 may be in a different form or data type than the fingerprint data structure 172 received from the mobile wireless device 100. For example, "raw" fingerprint data in a grid, may take up significant storage space and it may not be feasible to transmit a large quantity of data to the mobile wireless device 100. In example embodiments of the invention, the crowd-sourced fingerprint data structure 172' may be represented by refined models, such as coverage area models or path-loss models that model the radio environment. In example embodiments of the invention, the crowd-sourced fingerprint data structure 172' may include pointers to pre-established coverage area models or path-loss models stored in the local database 118 of the mobile wireless device 100. The fingerprint data structure transmitted by the server may be represented by at least one of a fingerprint data structure or models of a radiomap representing the floor areas.

In accordance with an example embodiment of the invention, the observation elements represent radio measurements that are of at least one of MAC addresses, received signal strength indication (RSSI), radio frequency (F), electromagnetic field strength, and electromagnetic radiation intensity and power, and the Discrete Fourier Transform (DFT) of the accelerometer 30 data. Typically RSSI is a measure of RF energy in dBm, which is ten times the logarithm of the ratio of the power (P) at the receiving end and the reference power (Pref). Power at the receiving end is inversely proportional to the square of distance. For example, the RSSI may be referenced to a Pref of 1 mW (dBm).

Electromagnetic field strength is measured in terms of volts-per-meter, magnetic field in terms of Amperes-per-meter, and intensity is power-per-unit area.

Figure 8:
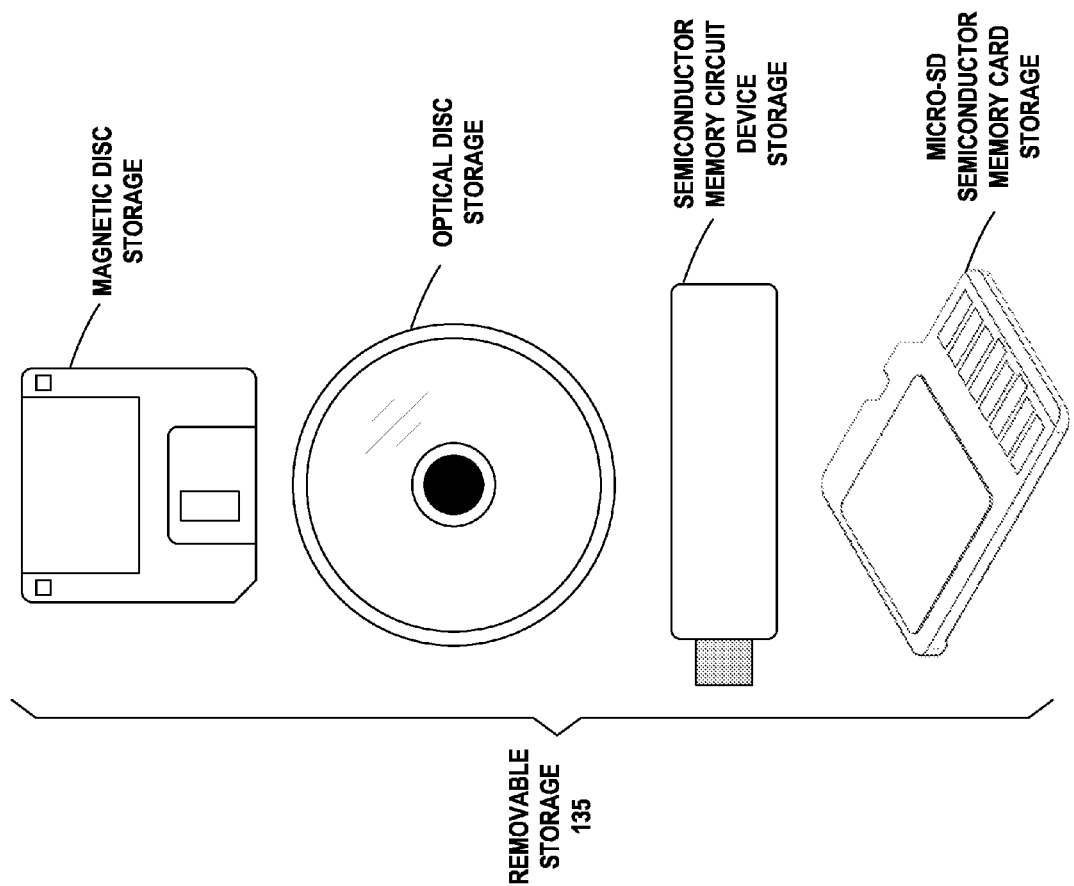
FIG. 8 illustrates an example embodiment of the invention, wherein examples of removable storage media are shown, based on magnetic, electronic and/or optical technologies, such as magnetic disks, optical disks, semiconductor memory circuit devices, and micro-SD memory cards for storing data and/or computer program code as an example computer program product, in accordance with at least one embodiment of the present invention.

FIG. 8 illustrates an example embodiment of the invention, wherein examples of removable storage media 135 are shown, based on magnetic, electronic and/or optical technologies, such as magnetic disks, optical disks, semiconductor memory circuit devices, and micro-SD memory cards for storing data and/or computer program code as an example computer program product, in accordance with at least one embodiment of the present invention.

An example embodiment of the invention comprises:

means for measuring, in a mobile device, acceleration of the mobile device in mutually orthogonal x and y directions in a horizontal plane and in a vertical direction, due to walking motion of a user holding the mobile device;

means for computing, by the mobile device, a Fourier transform of the measured acceleration of the mobile device in the vertical direction and determining a frequency of acceleration in the vertical direction having a maximum amplitude;

means for computing, by the mobile device, a Fourier transform of the measured acceleration of the mobile device in the x direction and in the y direction and determining a frequency of acceleration in the x direction and a frequency of acceleration in the y direction corresponding to the maximum amplitude frequency of acceleration in the vertical direction; and means for computing, by the mobile device, a direction of walking motion of the user, based on the determined frequency of acceleration in the x direction and the frequency of acceleration in the y direction corresponding to the maximum amplitude frequency of acceleration in the vertical direction.

Using the description provided herein, the embodiments may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable non-transitory medium.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless communication networks, the Internet, intranets, telephone/modem-based network communication, hard-wired/cabled communication network, satellite communication, and other stationary or mobile network systems/communication links.

Although specific example embodiments have been disclosed, a person skilled in the art will understand that changes can be made to the specific example embodiments without departing from the spirit and scope of the invention.

What is claimed is:

1. An apparatus, comprising:
at least one processor;
at least one memory including computer program code;
the at least one memory and the computer program code configured to, with the at least one processor, cause the apparatus at least to:
measure acceleration of the apparatus with an accelerometer in the apparatus, in mutually orthogonal x and y directions in a horizontal plane and in a vertical direction, due to walking motion of a user in a walking frame of the user, holding the apparatus, the walking motion of the user characterized by the acceleration in the x direction and the y direction being advanced in phase by 90 degrees or close to 90 degrees before the acceleration in the vertical direction;
compute a Fourier transform of the measured acceleration of the apparatus in the vertical direction and determine a frequency of acceleration in the vertical direction having a maximum amplitude in the frequency spectrum;
compute a Fourier transform of the measured acceleration of the apparatus in the x direction and in the y direction and determine a frequency of acceleration in the frequency spectrum in the x direction and a frequency of acceleration in the frequency spectrum in the y direction corresponding to the maximum amplitude frequency of acceleration in the frequency spectrum in the vertical direction;
compute a direction of walking motion of the user, based on the determined frequency of acceleration in the x direction and the frequency of acceleration in the y direction corresponding to the maximum amplitude frequency of acceleration in the vertical direction;
measure an orientation of an apparatus frame of the apparatus with respect to Earth coordinates, with a gyro or magnetometer in the apparatus; and
determine that the apparatus frame has changed its orientation with respect to the walking frame of the user, if both the gyro or magnetometer measurements change and the computed direction of walking motion of the user changes.

2. The apparatus of claim 1,
wherein the at least one memory and the computer program code configured to, with the at least one processor, cause the apparatus at least to:
determine, by a positioning engine in the apparatus, whether useable signals representing Earth-fixed coordinates are available at a current location;
invoke, by the positioning engine in the apparatus, at least a first programmed application for position determination for outdoor locations when the current location has useable signals available representing Earth-fixed coordinates; and
invoke, by the positioning engine in the apparatus, at least a second programmed application for position determination for indoor locations, using the computed direction of walking motion of the user, when the current location does not have useable signals available representing Earth-fixed coordinates.

3. The apparatus of claim 1,
wherein the at least one memory and the computer program code configured to, with the at least one processor, cause the apparatus at least to:
display, by a positioning engine in the apparatus, on a display of the apparatus, a map of an area near the user, oriented based on the computed direction of walking motion of the user; and
adjust, by the positioning engine in the apparatus, the displayed orientation of the map to show the direction of walking motion of the user, when orientation of the apparatus changes with respect to the direction of walking motion of the user.

4. The apparatus of claim 1,
wherein the at least one memory and the computer program code configured to, with the at least one processor, cause the apparatus at least to:
display, by a positioning engine in the apparatus, on a display of the apparatus, a current path traversed by the user on a map of an area near the user, based on the computed direction of walking motion of the user; and
adjust, by the positioning engine in the apparatus, the displayed current path traversed by the user on the map, to show the direction of walking motion of the user, when the user changes the direction of walking with respect to Earth-fixed coordinates.

5. The apparatus of claim 1, wherein the apparatus is a wireless communications device and configured to:
transmit, by the apparatus, a wireless message to a remote wireless communications device, the wireless message including information related to the computed direction of walking motion of the user; and
receive, by the apparatus, a wireless reply message from the remote wireless communications device, the reply information related to the computed direction of walking motion of the user.

6. The apparatus of claim 5 wherein the apparatus aligns the user's position to a set of fingerprint grid nodes.

7. The apparatus of claim 5, wherein the apparatus aligns the user's position using a refined model of fingerprint grid nodes.

8. A computer program product comprising computer executable program code recorded on a computer readable non-transitory storage medium, the computer executable program code comprising:
code for measuring in a handheld mobile device, acceleration of the device with an accelerometer in the device, in mutually orthogonal x and y directions in a horizontal plane and in a vertical direction, due to walking motion of a user holding the device, the walking motion of the user characterized by the acceleration in the x direction and the y direction being advanced in phase by 90 degrees or close to 90 degrees before the acceleration in the vertical direction;
code for computing a Fourier transform of the measured acceleration of the device in the vertical direction and determining a frequency of acceleration in the vertical direction having a maximum amplitude in the frequency spectrum;
code for computing a Fourier transform of the measured acceleration of the device in the x direction and in the y direction and determining a frequency of acceleration in the frequency spectrum in the x direction and a frequency of acceleration in the frequency spectrum in the y direction corresponding to the maximum amplitude frequency of acceleration in the frequency spectrum in the vertical direction;
code for computing a direction of walking motion of the user, based on the determined frequency of acceleration in the x direction and the frequency of acceleration in the y direction corresponding to the maximum amplitude frequency of acceleration in the vertical direction;
code for measuring an orientation of a device frame of the device with respect to Earth coordinates, with a gyro or magnetometer in the device; and
code for determining that the device frame has changed its orientation with respect to the walking frame of the user, if both the gyro or magnetometer measurements change and the computed direction of walking motion of the user changes.

9. The computer program product of claim 8, further comprising:
code for determining, by a positioning engine in the mobile device, whether useable signals representing Earth-fixed coordinates are available at a current location;
code for invoking, by the positioning engine in the mobile device, at least a first programmed application for position determination for outdoor locations when the current location has useable signals available representing Earth-fixed coordinates; and
code for invoking, by the positioning engine in the mobile device, at least a second programmed application for position determination for indoor locations, using the computed direction of walking motion of the user, when the current location does not have useable signals available representing Earth-fixed coordinates.

10. The computer program product of claim 8, further comprising:
code for displaying, by a positioning engine in the mobile device, on a display of the mobile device, a map of an area near the user, oriented based on the computed direction of walking motion of the user; and
code for adjusting, by the positioning engine in the mobile device, the displayed orientation of the map to show the direction of walking motion of the user, when orientation of the mobile device changes with respect to the direction of walking motion of the user.

11. The computer program product of claim 8, further comprising:
code for displaying, by a positioning engine in the mobile device, on a display of the mobile device, a current path traversed by the user on a map of an area near the user, based on the computed direction of walking motion of the user; and
code for adjusting, by the positioning engine in the mobile device, the displayed current path traversed by the user on the map, to show the direction of walking motion of the user, when the user changes the direction of walking with respect to Earth-fixed coordinates.

12. The computer program product of claim 8, wherein the mobile device is a wireless communications device and the computer program product further comprises:
code for transmitting, by the mobile device, a wireless message to a remote wireless communications device, the wireless message including information related to the computed direction of walking motion of the user; and
code for receiving, by the mobile device, a wireless reply message from the remote wireless communications device, the reply information related to the computed direction of walking motion of the user.

13. The computer program product of claim 8, wherein the mobile device is a wireless communications device and the computer program product further comprises:
code for displaying, by a positioning engine in the mobile device, on a display of the mobile device, a map of an area near the user, oriented based on the computed direction of walking motion of the user; and
code for adjusting, by the positioning engine in the mobile device, the displayed orientation of the map to show the direction of walking motion of the user, when orientation of the mobile device changes with respect to the direction of walking motion of the user, wherein the mobile device is configured to align the user's position to a set of fingerprint grid nodes.

14. The computer program product of claim 8, wherein the mobile device is a wireless communications device and the computer program product further comprises:

code for displaying, by a positioning engine in the mobile device, on a display of the mobile device, a map of an area near the user, oriented based on the computed direction of walking motion of the user; and code for adjusting, by the positioning engine in the mobile device, the displayed orientation of the map to show the direction of walking motion of the user, when orientation of the mobile device changes with respect to the direction of walking motion of the user, wherein the mobile device is configured to align the user's position using a refined model of fingerprint grid nodes.

* * * * *